US 11,606,059 B2

(12) United States Patent
West et al.

(10) Patent No.: US 11,606,059 B2
(45) Date of Patent: *Mar. 14, 2023

(54) OPTIMIZED TRUSS FOUNDATIONS, ADAPTERS FOR OPTIMIZED TRUSS FOUNDATIONS, AND RELATED SYSTEMS AND METHODS

(71) Applicant: Ojjo, Inc., San Rafael, CA (US)

(72) Inventors: Jack West, San Rafael, CA (US);
David Mar, Berkeley, CA (US);
Charles Almy, Berkeley, CA (US);
Tyrus Hudson, Petaluma, CA (US);
Johann Karkheck, Petaluma, CA (US);
Kathryn Pesce, El Cerrito, CA (US)

(73) Assignee: Ojjo, Inc., San Rafael, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/801,545

(22) Filed: Feb. 26, 2020

(65) Prior Publication Data

US 2020/0313602 A1 Oct. 1, 2020

Related U.S. Application Data

(63) Continuation of application No. 16/413,603, filed on May 16, 2019, now Pat. No. 10,615,739.

(60) Provisional application No. 62/796,020, filed on Jan. 23, 2019, provisional application No. 62/777,690, filed on Dec. 10, 2018, provisional application No.
(Continued)

(51) Int. Cl.
*H02S 20/32* (2014.01)
*F24S 25/61* (2018.01)
*F24S 30/425* (2018.01)
*F24S 25/617* (2018.01)
*H02S 20/10* (2014.01)
(Continued)

(52) U.S. Cl.
CPC .............. *H02S 20/32* (2014.12); *E02D 5/801* (2013.01); *F24S 25/617* (2018.05); *F24S 30/425* (2018.05); *H02S 20/10* (2014.12); *F24S 2030/15* (2018.05); *Y02E 10/47* (2013.01)

(58) Field of Classification Search
CPC .......... H02S 20/10; H02S 20/30; H02S 20/32; F24S 25/617; F24S 30/425; F24S 2030/15; Y02E 10/47
See application file for complete search history.

(56) References Cited

U.S. PATENT DOCUMENTS

| | | | | |
|---|---|---|---|---|
| 812,344 A | * | 2/1906 | Howser | .................... B25H 1/06 |
| | | | | 182/183.1 |
| 3,195,845 A | * | 7/1965 | Conti | ........................ A63B 7/00 |
| | | | | 256/64 |

(Continued)

FOREIGN PATENT DOCUMENTS

| | | | | |
|---|---|---|---|---|
| CN | 201413872 Y | * | 2/2010 | |
| CN | 103061333 A | * | 4/2013 | ........... B23K 33/006 |

(Continued)

*Primary Examiner* — Ryan D Kwiecinski
(74) *Attorney, Agent, or Firm* — Phillip D. Mancini

(57) ABSTRACT

An A-frame-shaped truss foundation system for a single-axis tracker with a bearing assembly sitting atop a pair of adjacent angled truss legs joined together with an adapter so that the axis of rotation of the tracker is aligned with a work point of the A-frame. Several such foundation systems are arranged along a North-South row to support a tracker torque tube.

9 Claims, 20 Drawing Sheets

Related U.S. Application Data

62/745,188, filed on Oct. 12, 2018, provisional application No. 62/727,456, filed on Sep. 5, 2018.

(51) Int. Cl.
*E02D 5/80* (2006.01)
*F24S 30/00* (2018.01)

(56) References Cited

U.S. PATENT DOCUMENTS

| | | | | |
|---|---|---|---|---|
| 5,822,940 | A * | 10/1998 | Carlin | E04C 2/384 52/459 |
| 6,508,349 | B1 * | 1/2003 | Lewin | G07F 17/248 194/350 |
| 6,659,692 | B1 * | 12/2003 | May | E02D 35/00 405/230 |
| 7,416,367 | B2 * | 8/2008 | St. Onge | E02D 5/80 405/230 |
| 7,472,666 | B1 * | 1/2009 | Richard | B63B 17/02 114/361 |
| D586,737 | S * | 2/2009 | Shugar | D13/102 |
| 7,490,964 | B2 * | 2/2009 | Haddad | E04H 12/2292 362/431 |
| 8,096,368 | B1 * | 1/2012 | Rider | E04H 17/263 173/90 |
| 8,609,977 | B2 * | 12/2013 | Jones | F24S 30/425 250/203.1 |
| 8,926,228 | B2 * | 1/2015 | Stroyer | E02D 5/52 175/323 |
| 9,068,318 | B1 * | 6/2015 | Gochis | E02D 5/28 |
| 9,340,944 | B2 * | 5/2016 | Kahlman | E02D 5/22 |
| 9,482,449 | B2 * | 11/2016 | Cole | F24S 30/425 |
| 9,675,829 | B1 * | 6/2017 | Katz | A63B 17/02 |
| 9,819,301 | B2 * | 11/2017 | Ripoll Agullo | F16C 33/046 |
| 9,932,718 | B2 * | 4/2018 | Blevins | E04H 9/021 |
| D844,078 | S * | 3/2019 | Salomone | D21/691 |
| 10,458,090 | B2 * | 10/2019 | Raposo | E02D 5/48 |
| 10,590,619 | B2 * | 3/2020 | Ronnkvist | E02D 7/02 |
| 10,669,686 | B2 * | 6/2020 | Stroyer | E02D 27/12 |
| 10,794,030 | B2 * | 10/2020 | Kemp | E02D 5/223 |
| 10,837,677 | B2 * | 11/2020 | Hudson | F24S 25/70 |
| 2007/0274618 | A1 * | 11/2007 | Sandin | F16C 23/046 384/212 |
| 2008/0029148 | A1 * | 2/2008 | Thompson | F24S 25/16 136/244 |
| 2008/0230047 | A1 * | 9/2008 | Shugar | H02S 20/32 126/569 |
| 2009/0184073 | A1 * | 7/2009 | Lu | A47G 25/0664 211/198 |
| 2009/0260316 | A1 * | 10/2009 | Jones | F24S 30/425 52/745.2 |
| 2012/0006317 | A1 * | 1/2012 | Sade | H02S 20/32 126/569 |
| 2013/0048582 | A1 * | 2/2013 | Kruse | F24S 30/425 29/897.31 |
| 2013/0340807 | A1 * | 12/2013 | Gerwing | H02S 20/32 136/246 |
| 2014/0102512 | A1 * | 4/2014 | Jones | F24S 30/455 136/246 |
| 2014/0301791 | A1 * | 10/2014 | Shahnazarian | E02D 5/56 405/252.1 |
| 2015/0236636 | A1 * | 8/2015 | Sade | F16M 11/06 136/246 |
| 2015/0236637 | A1 * | 8/2015 | Sade | F24S 30/428 136/246 |
| 2016/0013751 | A1 * | 1/2016 | Michotte De Welle | F24S 30/425 136/246 |
| 2016/0118929 | A1 * | 4/2016 | Krause | H02S 20/32 136/246 |
| 2016/0329860 | A1 * | 11/2016 | Kalus | H02S 20/10 |
| 2018/0051915 | A1 * | 2/2018 | Rainer | F24S 25/10 |
| 2018/0131312 | A1 * | 5/2018 | Sade | H02S 20/32 |
| 2018/0148901 | A1 * | 5/2018 | Kemp | E02D 5/223 |
| 2019/0212410 | A1 * | 7/2019 | Au | F24S 30/425 |
| 2019/0372514 | A1 * | 12/2019 | Almy | F24S 25/617 |
| 2020/0149241 | A1 * | 5/2020 | Flanigan | E02D 7/22 |
| 2020/0207486 | A1 * | 7/2020 | Correa Escobar | B64F 1/26 |
| 2020/0248424 | A1 * | 8/2020 | Hudson | E04H 12/2269 |
| 2021/0010217 | A1 * | 1/2021 | Kemp | E02D 5/223 |

FOREIGN PATENT DOCUMENTS

| | | | | |
|---|---|---|---|---|
| CN | 107012859 | A * | 8/2017 | |
| DE | 202010014899 | U1 * | 10/2011 | E04H 12/2223 |
| DE | 202011103199 | U1 * | 2/2012 | F24J 2/5239 |
| FR | 3001793 | A1 * | 8/2014 | F24S 30/425 |
| KR | 2016002829 | U * | 8/2016 | H02S 20/30 |
| WO | WO-9312312 | A1 * | 6/1993 | E01F 9/635 |
| WO | WO-2004063294 | A1 * | 7/2004 | C08F 251/02 |
| WO | WO-2016142227 | A1 * | 9/2016 | F24S 25/10 |

* cited by examiner

OPTIMIZED TRUSS FOUNDATIONS, ADAPTERS FOR OPTIMIZED TRUSS FOUNDATIONS, AND RELATED SYSTEMS AND METHODS

CROSS-REFERENCE TO RELATED APPLICATIONS

This is a continuation of U.S. patent application Ser. No. 16/413,603 filed on May 16, 2019, titled "Optimized truss foundations, adapters for optimized truss foundations, and related systems and methods, now U.S. Pat. No. 10,615,739, which claims priority to U.S. provisional patent application No. 62/727,456 filed on Sep. 5, 2018, titled "FOUNDATION PIERS FOR AXIAL SOLAR ARRAYS AND RELATED SYSTEMS AND METHODS," No. 62/745,188 filed on Oct. 12, 2018, titled "OPTIMIZED A-FRAME FOUNDATIONS FOR AXIAL SOLAR ARRAYS AND RELATED SYSTEMS AND METHODS," No. 62/777,690, filed Dec. 10, 2018, titled "FORCE OPTIMIZED A-FRAME-TO-MONOPILE ADAPTER FOR SINGLE AXIS TRACKER," and No. 62/796,020, filed Jan. 23, 2019, titled "PILE CAPS, ADAPTERS AND BEARING HOUSING ASSEMBLIES FOR A-FRAME FOUNDATIONS," the disclosures of which are hereby incorporated by reference in their entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter$*\pi*6,371,000$ meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are frontloaded while the operating costs are comparatively low. Fossil fuel-based energy sources require up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are not reflected in the cost. In addition to this cost advantage, entrenched utilities and fossil fuel producers have lobbied effectively to stymie the progress of solar, even in states with the greatest solar potential.

Notwithstanding these headwinds, the cost of solar has now dropped low enough that even when coupled with energy storage, solar power it is equivalent to or less expensive than power generated from coal, oil and even natural gas. In the context of the electricity market, the relative cost difference between competing sources is quantified in terms of the cost per unit, typically a kilowatt hour (kWh). Large scale solar arrays, so called "utility-scale" arrays, may have tens to hundreds of megawatts of power generating capacity, putting them on the same scale as small coal and natural gas-fueled power plants. These arrays generate power that is fed into the grid and sold at wholesale prices on the order of a few cents per kWh.

The development of utility-scale solar projects is typically funded against power purchase agreements (PPAs). With a PPA, an off-taker (e.g., utility, grid operator, etc.) agrees to purchase all the power generated by the system at a fixed rate for the operational life of the array (e.g., 30 years). This enables a bank or other investor to accurately value the future revenue stream and to loan money against it to finance construction of the array.

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Excluding land acquisitions costs, overall costs for utility-scale arrays include site preparation (road building, leveling, grid and water connections etc.), foundations, tracker or fixed-tilt hardware, solar panels, inverters and electrical connections (conduit, wiring, trenching, grid interface, etc.). Many of these have come down in price over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and site plan; the tracker system components are subsequently attached to the head of those piles. Most often, the monopiles used to support the tracker have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored into calculations that supported the construction of the project.

One reason monopiles continue to dominate the market for single-axis tracker foundations is simplicity. It is relatively easy to drive monopiles into the ground along a straight line with existing technology even through their design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into the foundation as a bending moment. The magnitude of the bending moment is much greater than the static loading attributable to the weight of the panels and tracker components. It acts like a lever arm trying to bend the pile, and the longer the lever arm, the greater the magnitude of the force. Many tracker companies specify a minimum foundation height of 40-inches or more. Therefore, in the context of single-axis trackers, monopile foundations must be oversized and driven deeply into the ground to withstand lateral loads.

One proposed alternative to monopile foundations is to use a pair of steeply angled legs to form an A-frame or truss-like foundation. An A-frame has the advantage of potentially converting lateral loads due to wind impinging on the array into axial forces of tension and compression in the legs, however, not all A-frame foundations will perform the same. The point at which lateral loads are translated into the legs of the A-frame will dictate how these forces are distributed and whether a bending moment is introduced. Also, the angle of the legs of the A-frame with respect to horizontal has a non-linear effect on the magnitude of tensile and compressive forces. Therefore, it is an object of various embodiments of this disclosure to provide A-frame foundations for single-axis trackers that ideally prevent the introduction of a moment into the truss leg and that limit and ideally minimize the magnitude of the tensile and compressive forces.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
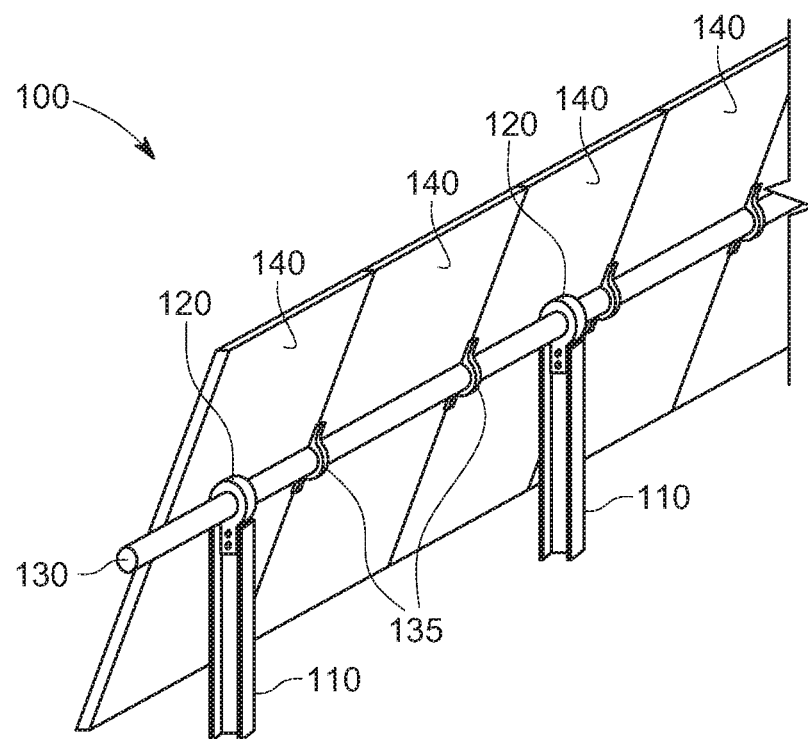
FIG. 1A is a perspective view of a portion of a conventional single-axis tracker supported by multiple monopile foundations.

As discussed in the background, when a single-axis tracker is supported by monopile foundations, lateral loads induced by wind striking the array generate large bending moments that must be resisted by the foundation. FIG. 1A shows a portion of single-axis tracker 100 supported by aligned monopile foundations 110. Tracker 100 in this figure consists of solar panels 140, attached to torque tube 130 via panel brackets 135. Torque tube 130 is captured within multiple aligned bearing assemblies 120 that are each attached atop respective monopiles 110. Monopiles 110 shown here are H-piles although other types, including C-channel and boxed profile, may be used. Though not shown in the figure, one pile will also typically support a drive motor or gear assembly that drives torque tube 130. Also, electrical interconnections between the solar panels 140 have been intentionally omitted. In real world conditions, adjacent panels 140 would be connected serially to form high voltage direct current (DC) strings that are fed into one or more combiner boxes and/or inverters.

Single-axis tracker 100 is a typical bottom-up design where the bearing assembly 120 sits on top of pile 110 and torque tube 130 rotates within circular bearing 120 about its own axis. As shown and discussed in greater detail herein, other tracker systems employ a top-down design where the torque tube hangs from a bearing pin in a bearing housing so that the torque tube can sweep through a range of angles like a pendulum. One such top-down tracker is disclosed, for example, in U.S. Pat. No. 10,222,446, hereby incorporated by reference in its entirety. In such systems, the drive motor is offset so that the tracker's axis of rotation offset from the portion of the torque tube driven by the motor. The various embodiments of the invention are compatible with bottom-up as well as top-down single-axis trackers.

Figure 1B:
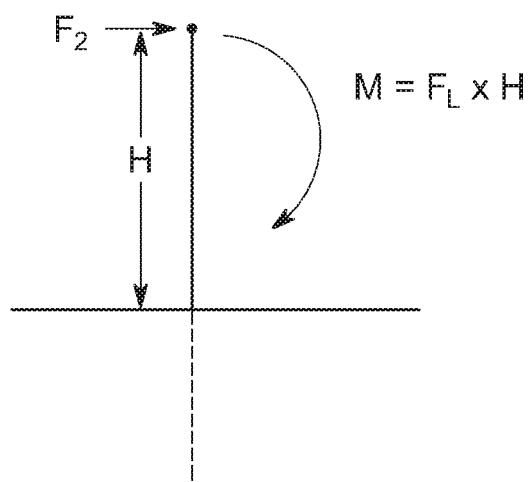
FIG. 1B is a force diagram showing the effect of lateral loads on the single-axis tracker of FIG. 1A.

FIG. 1B is a force diagram showing the effect of lateral loads on a single-axis tracker that is supported by monopile foundations. Lateral load $F_L$ imparts a bending moment M on each foundation. The point of application of this force is the point where the axis of rotation, in this case, the torque tube, is attached to the pile (e.g., at the bearing assembly). The magnitude of the resulting moment M is equivalent to the magnitude of force $F_L$ multiplied by the height H above the point where the foundation is pinned to the ground. If the pile extends four feet above ground, as is common in the industry, and the lateral load is equivalent to 2,500 pounds, the resultant moment M=2500×4 or 10,000 lb./ft. Therefore, to achieve the necessary structural rating, the piles used to support the array must be rated to resist such a moment and be driven deep enough to remain pinned when subjected to such a moment. This requires the use of a strong monopile, such as the commonly used W6×9 or W6×12 H-pile, which have a six-inch flange and nine or twelve pounds of steel respectively per linear foot, with as much as five to seven feet of below-ground embedment.

Figure 2A:
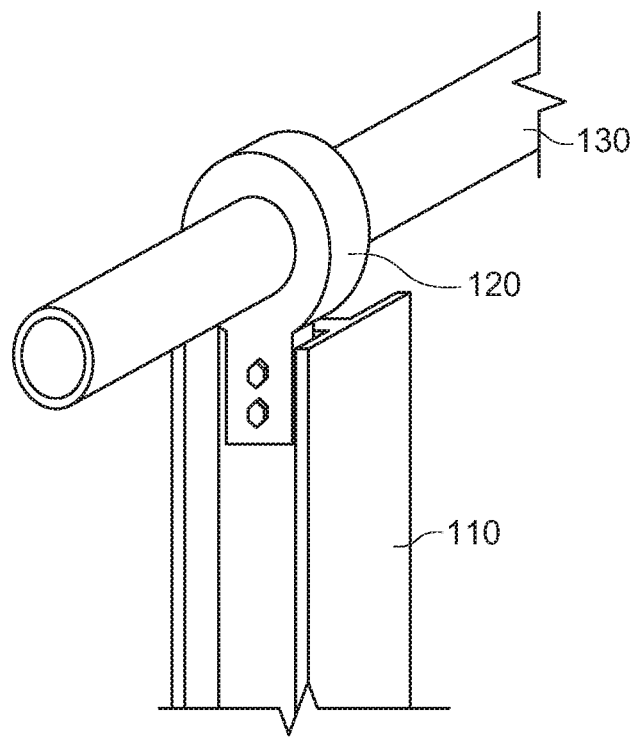
FIGS. 2A-2D show various commercially available bearing assemblies used with single-axis trackers supported by monopile foundations.

FIG. 2A shows a portion of a generic single-axis tracker. The portion shown in the figure includes the torque tube-to-bearing-to-pile connection representative of one of many different single-axis tracker systems available today. In this example, the tracker is supported by plumb H-pile 110. Bearing assembly 120 is attached directly to the web of pile 110 with two bolts so that the bearing extends above the pile. For ease of illustration, only a single pile is shown in the FIG. In a complete system, several H-piles would be driven along a North-South oriented row at the locations specified by the tracker maker and/or in the site plan. The top end of each pile 110 may have a series of holes or slots pre-drilled in the web or flanges to enable the bearing assembly to be attached with conventional bolts, rivets or other suitable mechanical fasteners. As used herein, the term "bearing assembly" is used generically to refer to a bearing or bearing assembly or other device that provides a cylindrical bearing to receive a rotating member. The rotating member may be a torque tube, or, in other cases, a bearing pin from which the torque tube is suspended.

Figure 2B:
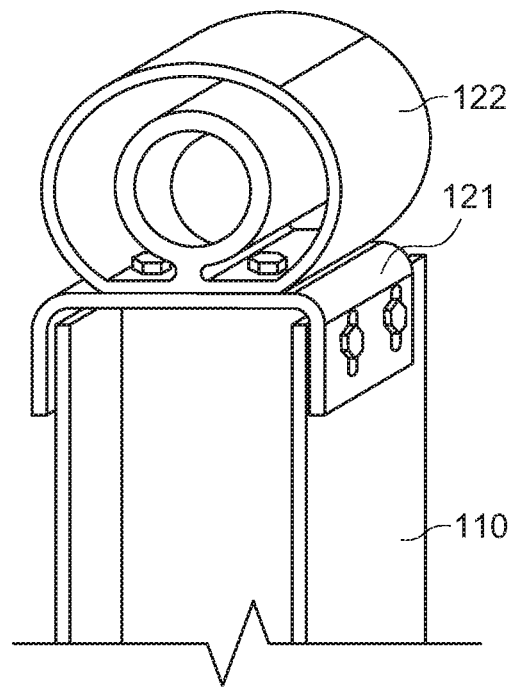

FIG. 2B shows another bearing assembly for a bottom-up single-axis tracker. This assembly consists of pile cap 121 and bearing 122, in this case a portion of the DURATRACK HZ single-axis tracker from ARRAY TECHNOLOGIES, INC. of Albuquerque, N. Mex. Pile cap 121 and bearing 122 are referred to collectively as the bearing assembly. The assembly is dimensioned to fit over a standard wide-flange H-pile, such as a W6×9 or W6×12, both of which have a web depth of approximately six inches. The assembly may come preassembled as one piece so that installers need only bolt the pile cap 121 to the pre-drilled holes in the flanges to complete the installation. Alternatively, these elements 121, 122 may be joined on-site so that the position of bearing 122 can be adjusted in the East-West plane as well as vertically to align bearing 122 with the other bearings in the same row.

Figure 2C:
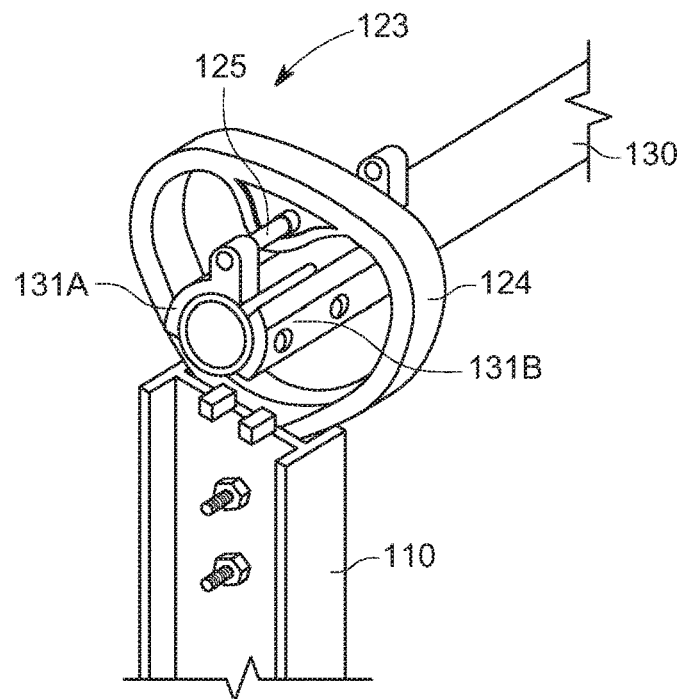

FIG. 2C, shows another bearing assembly 123 for a top-down tracker. This tracker was originally manufactured and sold by NEXTRACKER of Fremont, Calif. under the trade name NX Series. Like the pile of FIGS. 2A and B, pile 110 shown here is a conventional W6×9 or 6×12 H-pile, however, unlike the trackers shown in 2A and 2B, NEXTRACKER's single-axis tracker is a top-down design that purports to be mechanically balanced. The axis of rotation and drive motor are offset from the main axis of the torque tube so that there is no overturning moment to the system regardless of the orientation of the panels (e.g., East to West). According to the manufacturer, this feature lowers the amount of torque required to rotate the torque tube. In the system, this is accomplished is by hanging torque tube 130 from torque tube clamp support 124 via tube clamp sections 131A/B suspended from bearing pin 125. Rather than rotating about its own axis, torque tube 130 swings through an arc about bearing pin 125 as the tracker moves from East to West. This requires additional clearance in the East and West directions which, in this system, is provided by clamp support 124. Clamp support 124 shown here attaches to the web of H-pile 110 with a vertical mounting portion analogous to generic bearing assembly 120 FIG. 2A. Ends of bearing pin 125 are received within respective recesses formed in two-piece torque tube clamp 131A/B in the figure. The portions of torque tube clamp 131A/B that engage torque tube 130 are curved to match the curved outside geometry of the tube and are secured to the tube via bolts passing through pre-drilled holes in the clamp sections and in the tube. As the drive motor applies torque to tube, the tube and clamp assembly swing about bearing pin 125 within the space defined by clamp support 124.

Figure 2D:
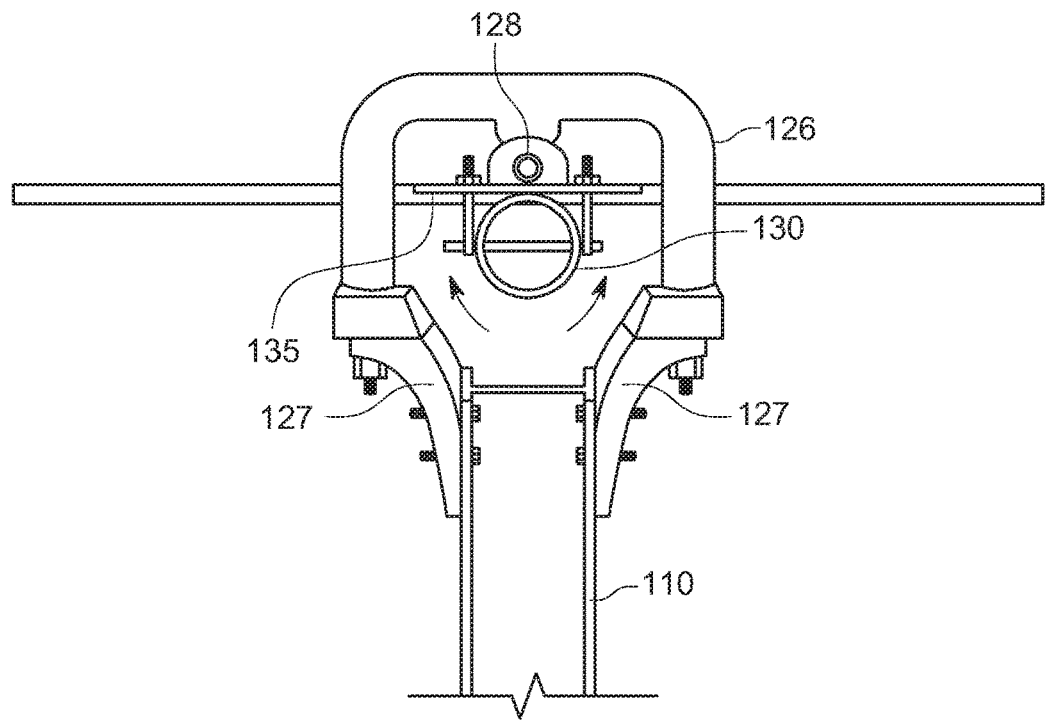

FIG. 2D, shows a newer version of a portion of the NEXTRACKER NX series tracker. This version replaces the assembly of 2C with U-shaped torque tube clamp support 126 that rests atop right-angle brackets 127. Right-angle brackets 127 are bolted to the outer surface of the pile flanges at the head of pile 110 via pre-drilled holes in each flange. Brackets 127 extend the width of pile 110 and provide a horizontal, planar support surface for the feet of torque tube clamp support 126 to rest on. As shown, each foot has a bolt projecting out of it that passes through the horizontal surface of a respective one of brackets 127 to secure support 126 to pile 110. The tubular legs of support 126 project upward away from the feet and curve 90-degrees towards one another, defining an upside-down U shape. A bearing is located at the center of clamp support 126 that receives bearing pin 128. Respective halves of torque tube clamp assembly 131A/B rotate engage bearing pin 128 to enable the torque tube to swing through an arc. In the NEXTRACKER system, U-bolts are also fitted around torque tube 130 to clamp module brackets 135 to the tube. The edge of two adjacent PV modules 140 are attached to each module bracket 135 to secure them to tube 130. Although each of the tracker systems and bearing assemblies shown in FIGS. 2A-2D assumes a plumb, monopile foundation, nothing in the design of these systems requires such a foundation.

The inventors and applicant of this disclosure have proposed an alternative to plumb monopile foundations that aims to significantly reduce the total amount of steel required to support single-axis trackers and other axial solar arrays. This alternative foundation system, referred to commercially as EARTHTRUSS™, consists of a pair of moderately sloped legs configured as an A-frame or truss that extend above and below ground and are joined at the apex with an adapter, bearing assembly, or other torque tube support element. The legs are substantially aligned on the torque tube rather than offset from one another in the axis of the torque tube. Put differently, an imaginary line through their respective centers of mass intersects at a point that overlaps with the tracker's axis of rotation. The truss architecture offers several advantages over conventional monopiles foundations. First, if properly designed, the A-frame will translate lateral loads into axial forces of tension and compression in the legs rather than bending. Individual structural members are poor at resisting bending but relatively good at resisting axial forces. The A-frame or truss directs lateral loads along the axis of the legs where it is best applied. Therefore, the size and gauge of the steel that makes up the legs may be much smaller than an equivalent monopile. Also, without needing to resist bending, the legs do not need to be driven as deep as conventional monopiles. This saves steel but also reduces the likelihood of encountering a refusal. A refusal occurs when additional impacts of a pile driver fail to result in additional embedment of the pile. Usually, this is the result of striking rock or cementious soil and requires an expensive, labor-intensive mitigation process. The shallower piles are driven, the less likely it is that they will encounter rock or cementious soil.

Figure 3A:
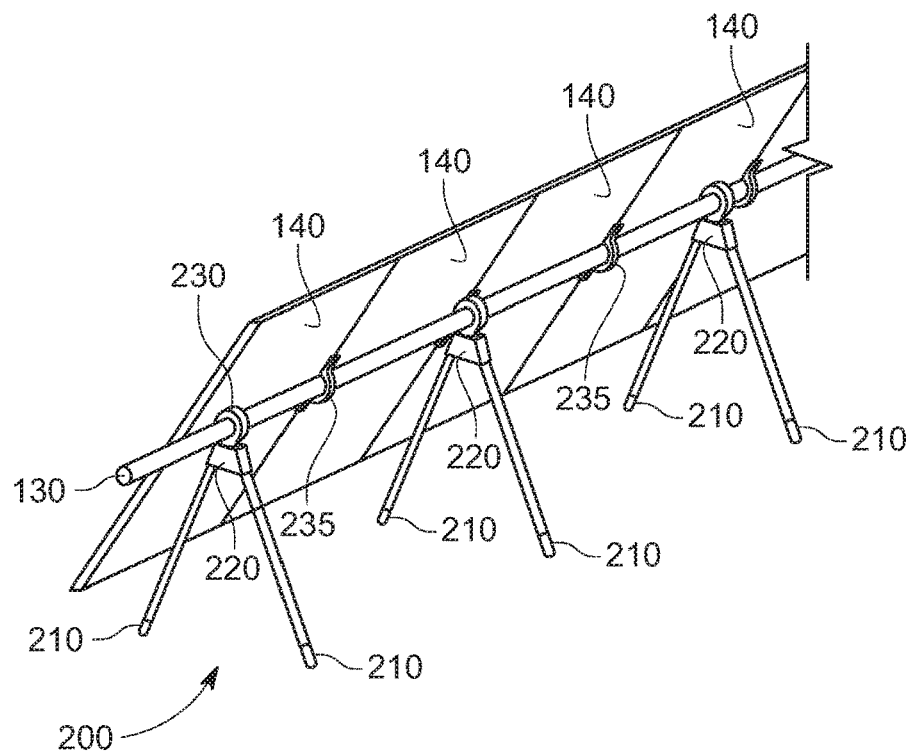
FIG. 3A is a perspective view of a portion of a single-axis tracker supported by multiple A-frame-shaped truss foundations according to various embodiments of the invention.

Turning now to FIG. 3A, this figure shows a single-axis tracker system 200 and truss foundation according to various exemplary embodiments of the invention. The single-axis tracker shown here is like that of FIG. 1A but is supported by aligned truss or A-frame-shaped foundations 200 rather than monopiles. Each truss foundation 200 consists of a pair of adjacent legs 210 extending below and above ground at angles to one another so that they are substantially symmetric with respect to the torque tube. Legs 210 may be beaten into the ground with a pile driver, rotated into the ground with a rotary driver, pushed into the ground, or otherwise driven. Also, they may consist of a single member or multiple interconnected members defining a common axis. Truss foundations 200 are installed along a North-South row at regular intervals specified by the tracker maker. Free, above-ground ends of each leg 210 are joined with an adapter such as adapter 220 and bearing assembly 230 sits atop the adapter. Torque tube 130 passes through the bearing of each bearing assembly 230.

Figure 3B:
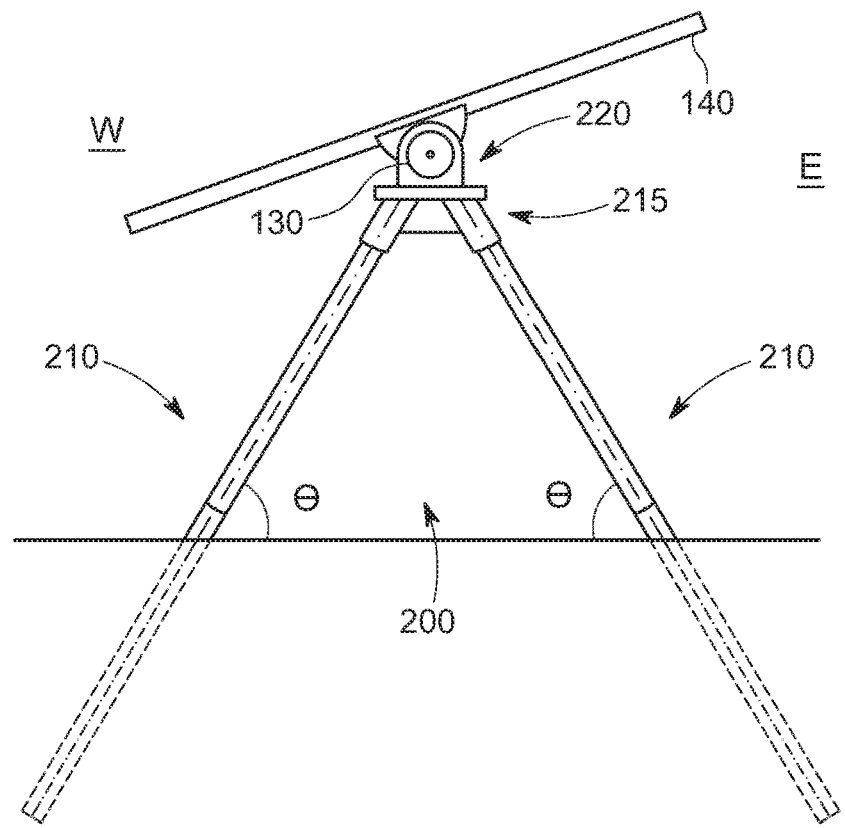
FIG. 3B is an end view of one the A-framed truss foundations shown in FIG. 3A.
Figure 3C:
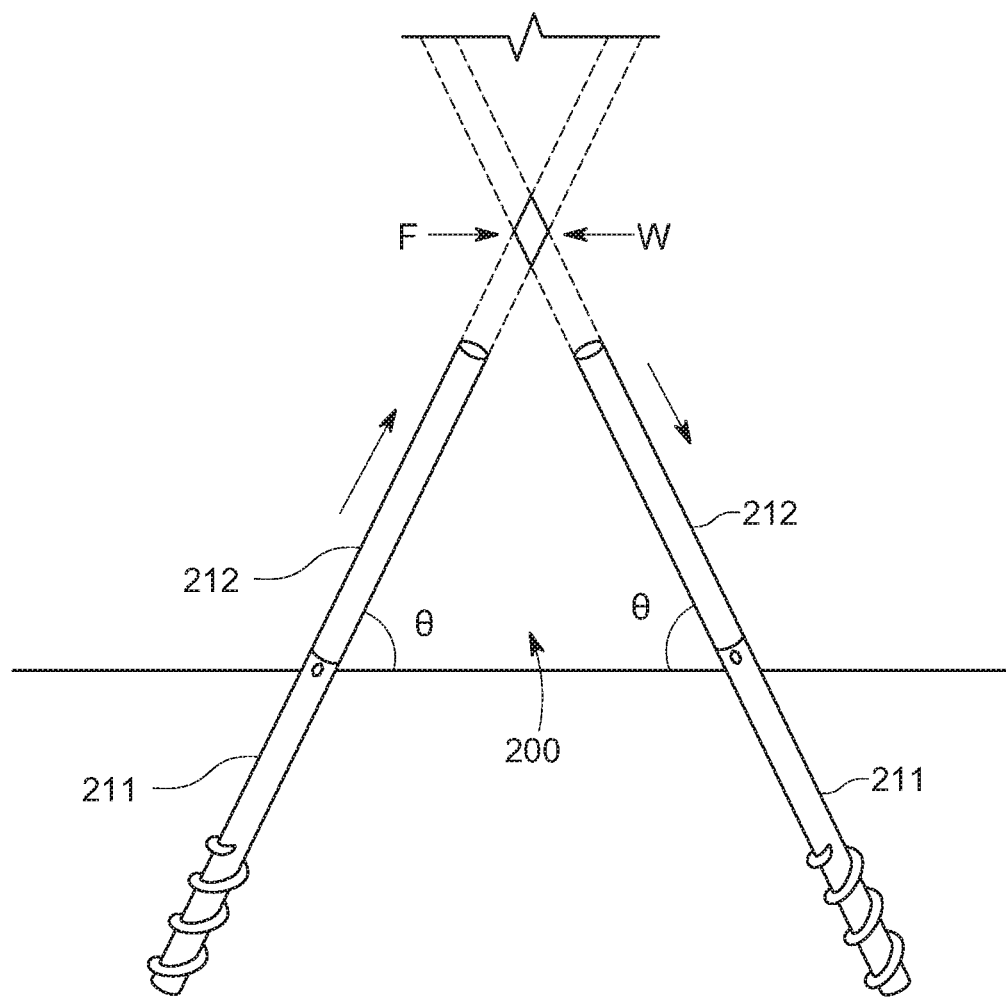
FIG. 3C is partial end view of one of the A-framed truss foundations shown in FIGS. 3A and B, showing the work point of the A-frame relative to the truss legs.

FIG. 3B is an end-view of the tracker of 3A showing the geometry of legs 210 and 3C shows the impact of lateral loads on the legs. An imaginary line has been drawn through the center of mass of each truss leg 210 in 3B to show their point of intersection. In FIG. 3C, the apex hardware (e.g., torque tube, panels, etc.) has been removed to provide greater detail. The foundation has been designed so that the tracker's axis of rotation—in the case of FIGS. 3A and B, the torque tube's main axis—is precisely aligned with the work point of the A-frame.

The primary failure mode of an A-frame foundation is buckling. For a given leg, the propensity to buckle will be impacted by the angle that the leg is oriented at with respect to horizontal and the location of the axis of rotation with respect to the A-frame's work point. Regarding the former, moderately sloped A-frames (e.g., legs sloped less than ±72.5-degrees with respect to horizontal) experience much lower forces of tension and compression than steeper sloped ones for a given lateral load. This stems from the fact that the lateral load translates into tensile and compressive forces at the rate of $1/(2*\cos(e))$ where e is the angle of the A-frame legs. The preferred range of leg angles with respect to horizontal is between 55 degree and just below 72.5 degrees, ideally at or below 65 degrees. A 2,500-pound lateral load will get translated into forces of tension and compression in the legs of 2,500 pounds each at 60-degrees, 2957 pounds at 65-degrees, and 4156 at 72.5-degrees. At 75-degrees this force jumps up to 4,829 pounds and continues increasing exponentially toward infinity as the leg angle approaches 90-degrees, therefore moderate angles below 72.5 degrees are preferred. Due to the difficulty in measuring truss leg angles, and the possibility that the legs will be oriented at different angles, a better measure if the angle of separate of the legs at the apex set by the adapter. The preferred leg angles correspond to preferred apex angles above 35-degrees.

Regarding alignment with the work point, every A-frame or truss has an ideal point for resisting lateral loads that keeps it in pure tension and compression as opposed to a combination of that and bending. That ideal point is the intersection of an imaginary line extending through the center of mass of each leg referred to herein as the work point. For a given leg angle and/or top angle and required depth of embedment, the work point will be known. Therefore, the portion of the A-frame legs extending into the ground must be driven with the work point in mind so that each leg points at the work point. If so, a line extending through each leg's center of mass will extend to a common above-ground intersection point or three-dimensional area in free space that should overlap with the rotational axis of the tracker. In the case of a bottom-up tracker where the torque tube rotates about its own axis, the torque tube should pass through the work point for each A-frame or truss foundation supporting it. In the case of a top-down tracker, the axis of the bearing pin about which the torque tube rotates should pass through work point.

With continued reference to FIGS. 3B and C, these figures show one A-frame-shaped truss foundation 200 according to various embodiments of the invention. Truss foundation 200 consists of legs 210 formed from screw anchors 211 coupled to respective upper legs 212. Screw anchors 211 shown here include a thread form beginning at their below-ground end and extending along the anchor's shaft. They are rotated into the ground angled towards one another with a rotary driver.

In this exemplary system, an upper leg is attached to the top end of each screw ancho. In other embodiments, screw anchor 211 and upper leg 212 may be consolidated into a single structural member. As shown, upper legs 212 extend along the same axis as their respective screw anchors 211 (i.e., are oriented at substantially the same angle), projecting upward along that axis in free space. Screw anchors 211 and upper legs 212 may be coupled to one another using a separate coupler, set screws, rivets, bolts, by nesting one within the other, by reciprocal male/female features formed into both or, by some combination of these techniques. After screw anchors 211 and upper legs 212 are joined, an adapter, saddle or other structure 215 is attached to the free ends to complete A-frame-shaped truss foundation 200 and to provide a platform for attaching torque tube support components.

If the piles are driven at substantially the same angle (e.g., ±60-degrees), they will point at an imaginary intersection point in free space. Imaginary lines extending through the center of mass of each leg, in this case the middle of each, shown as dotted lines in FIG. 3B, intersect at the work point of the A-frame. The location of the work point relative to the ground will vary with truss leg angle θ/top angle α as well as with the spacing between the legs at the point where they are driven into the ground. The steeper the leg angle/smaller the top angle, or further apart the screw anchors are when driven into the ground, the higher the work point will be.

It is important to appreciate that in a single-axis tracker, forces are translated to the foundation via the rotational axis of the system (i.e., the point that the rotating parts rotate about or within). In most single-axis tracker systems, where a torque tube is captured within a circular bearing, the torque tube itself defines the axis of rotation. Lateral forces are transferred to the foundation directly via the bearing assembly surrounding the tube. However, as discussed in the context of FIGS. 2C and D, in the NEXTRACKER single-axis tracker, the torque tube is offset from the axis of rotation. The tube is attached to a tube clamp that hangs from a hinge point formed in a torque tube clamp support. As a result, the axis of rotation is about the axis of the hinge, not the tube itself. Regardless of which style of single-axis tracker that is supported, when supported by an A-frame-shaped truss, the axis about which rotation occurs should ideally pass through the work point. Otherwise, some bending will be introduced in response to lateral loads, requiring that the truss legs must be made stronger. Using more metal to construct the legs is antithetical to the goal of reducing steel and negates some of the benefits of a truss relative to monopiles. Because this problem is unique to A-frame foundations, it is not one that tracker makers have needed to design for, however, even those who have proposed A-frame foundations for single-axis trackers have failed to recognize the significance of the work point in reducing and ideally eliminating moments.

Figure 4A:
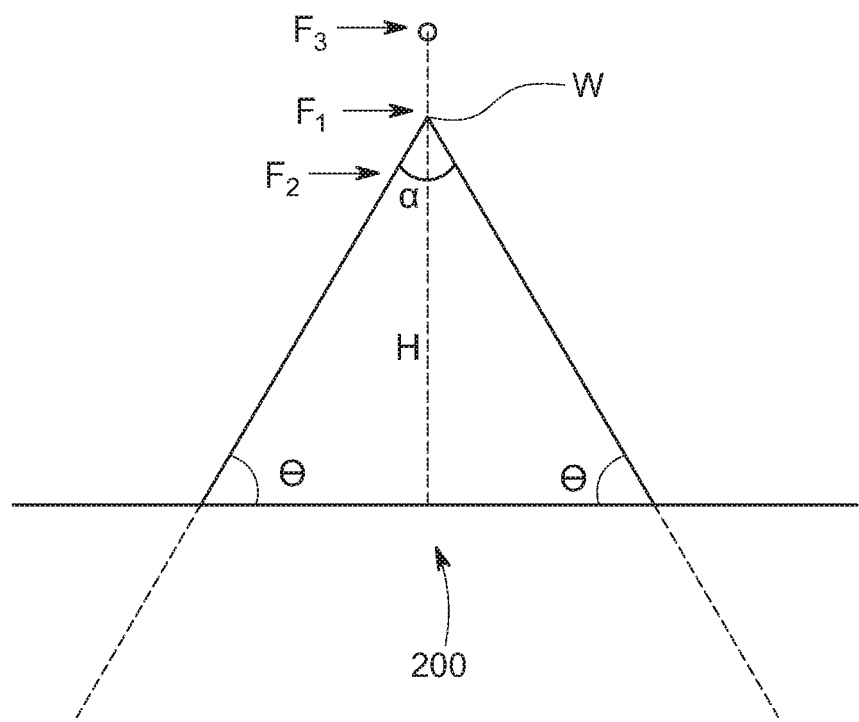
FIG. 4A is a force diagram showing a lateral load applied at different points on an A-frame-shaped truss foundation.
Figure 4B:
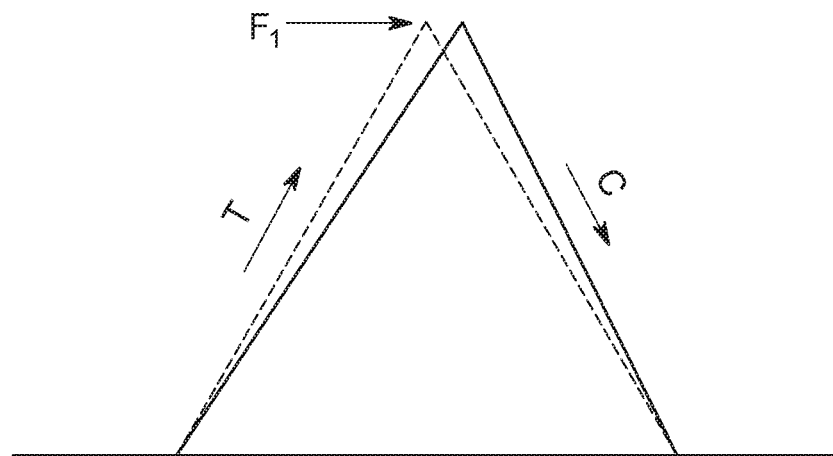
FIG. 4B is a force diagram showing the effect of a lateral load applied at the work point of an A-frame-shaped truss foundation.

FIG. 4A is a diagram showing three different forces impingent on A-frame-shaped truss 200 and FIGS. B-D are force diagrams illustrating the effect of these respective lateral loads. FIG. 4A shows lateral loads labeled as $F_1$, $F_2$, and $F_3$ applied at different points to truss 200. Force $F_1$ is applied precisely at the work point, while force $F_2$ is applied below it and force $F_3$ is applied above. As discussed herein, lateral loads are translated into the truss legs via the tracker's axis of rotation. When the axis is aligned with the work point, as shown in 4B, the load is perfectly translated into tension in the windward leg and compression in the leeward leg. This may cause some deflection at the apex or work point but will not tend to buckle the truss. Rather, the failure mode will be pulling out the windward leg and further burying the leeward one against the forces of skin friction and any orthogonal surface area to the screw anchor resisting these forces.

Figure 4C:
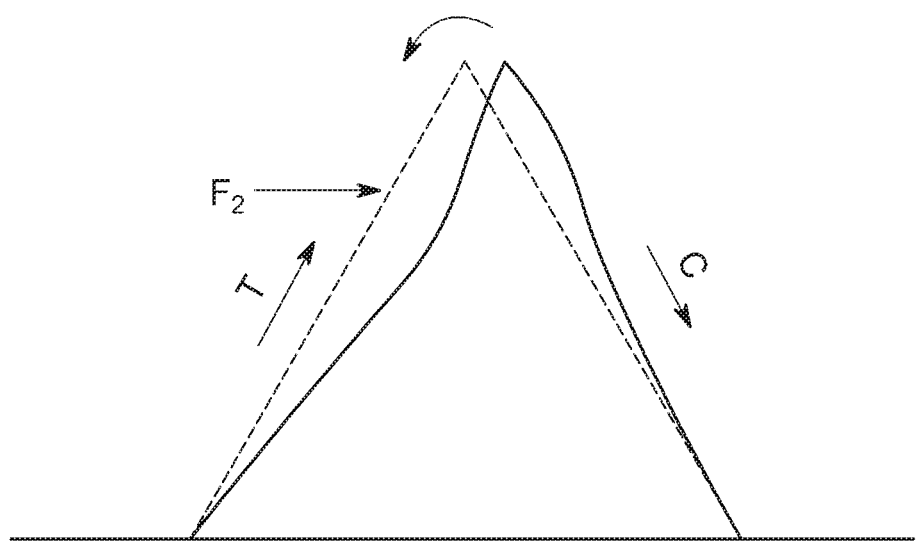
FIG. 4C is a force diagram showing the effect of a lateral load applied below the work point of an A-frame-shaped truss foundation.
Figure 4D:
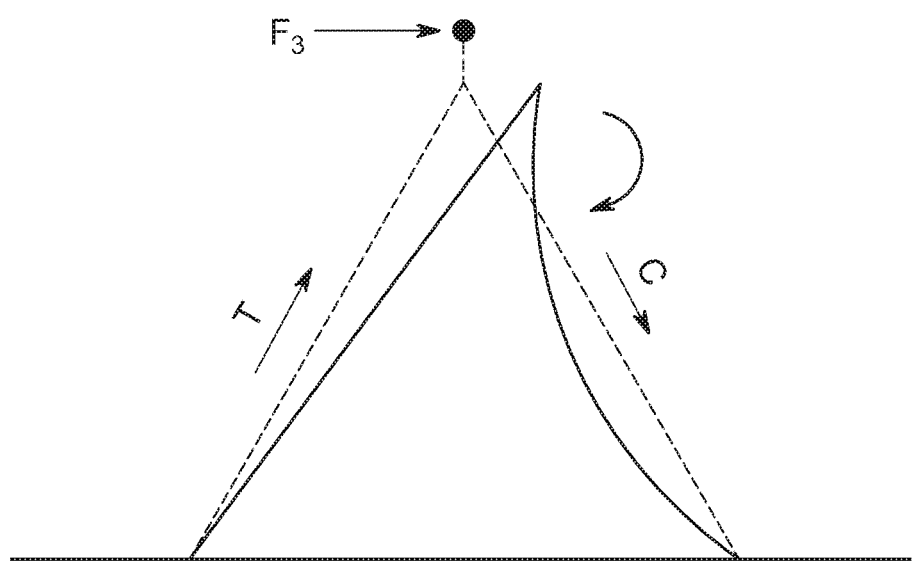
FIG. 4D is a force diagram showing the effect of a lateral load applied above the work point of an A-frame-shaped truss foundation.

By contrast, FIGS. 4C and 4D illustrate the failure modes when the axis of rotation is offset from the work point. In 4C, the axis is positioned below the work point. This makes the windward leg vulnerable to deforming inward in response. To compensate, the windward leg must be reinforced (e.g., larger diameter, more steel, etc.). Similarly, in the 4D, the axis of rotation is above the work point. In this case, the lateral load imparts a moment that tends to buckle the leeward leg. To prevent this, the leeward leg must be reinforced. In recognition of this, and to minimize material usage, various embodiments of the invention provide a truss or A-frame foundation for single axis trackers that supports the torque tube so that its rotational axis is aligned with, or can be adjusted to align, with the work point of the A-frame.

The remainder of the disclosure is directed to various exemplary embodiments of adapters, torque tube support elements and bearing assemblies that are used to accomplish alignment of the rotational axis of a single-axis tracker with the work point of the truss foundation. Beginning with FIGS. 5A and B, these figures are perspective and front views respectively of universal adapter 300 according to various exemplary embodiments of the invention. Element 300 is referred to generally as an adapter because it joins the legs of an A-frame or truss foundation system while providing a mechanical interface to the tracker that matches the H-pile flange and web upper geometry most single-axis trackers are designed to attach to. Consequently, adapter 300 according to FIGS. 5A and B may be useable with any of the prior art tracker systems shown in FIGS. 2A-D and even other single-axis tracker systems not shown in the disclosure. The main body of adapter 300 is shown as a having an H-pile section (e.g., W6×9) with opposing flanges 310 interconnected by web 320. Mounting holes 312, 322, and 323 are formed in flanges 310 and web 320 respectively. Connecting portions 330 project down and out of each flange 310 on either side. In various embodiments, coupling portions 330 project downward symmetrically at angles β to one another (e.g., +20 degrees and −20 degrees) with respect to vertical, which in this figure is the outer surface of each flange 310. In other words, the angle between connecting portions 330 is 2*β. In various embodiments, the angles β of coupling portions 330 may be within a range of more than ±17.5 up to ±35-degrees with respect to vertical to match the truss angle of the legs of the A-frame. Alternatively, the angle between connecting portions may be more than 35-degrees up to 70-degrees. For example, if the legs are oriented at ±60-degrees with respect to horizontal or level grade, connecting portions 330 will extend down at an angle β of ±30-degrees with respect to vertical flanges 310 meaning that the angle between connecting portions 330 is 60-degrees. In various embodiments, for a given connecting portion angle β, the legs of the A-frame may be angled with respect to horizontal at an angle equivalent to ±90 degrees minus β so that the receiver and extension piles extend along substantially the same axis.

Figure 5A:
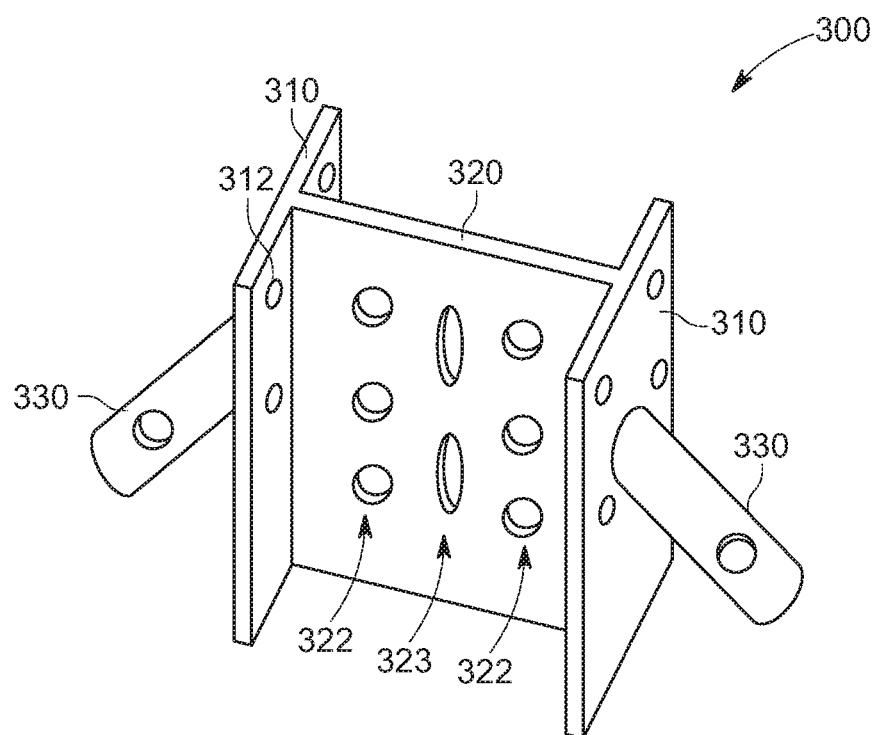
FIG. 5A is perspective view of an adapter for a single-axis tracker that orients lateral loads at the work point of an A-frame-shaped truss foundation according to various embodiments of the invention.

As shown, exemplary adapter 300 of FIGS. 5A and B has three separate sets of attachment features for attaching torque tube support elements. The first is formed as vertical slots 323 bisecting the web, the second, shown as distributed holes 312 in each flange, and the third, also formed in the web, as holes 322 straddling set 323. It should be appreciated that this configuration is exemplary only and that in various embodiments, each set of features may consist of vertical slots, horizontal slots, or holes and that fewer, more or combinations of these features may be used. The unifying concept of these potential variations is that adapter 300 completes the A-frame while providing multiple sets of attachment features to accommodate different tracker systems that so that the truss legs point at the work point and that the rotational axis also passes through this work point.

Figure 5B:
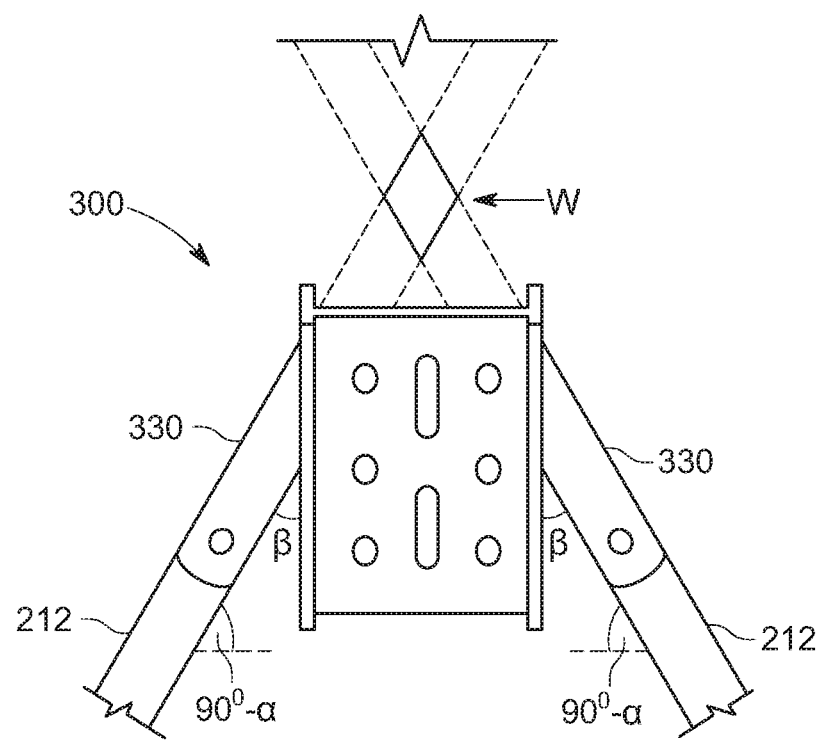
FIG. 5B is front view of an adapter for a single-axis tracker that orients lateral loads at the work point of an A-frame-shaped truss foundation according to various embodiments of the invention.

FIG. 5B is a front view of adapter 300. Dotted lines drawn parallel to the outer surface of each upper leg 212 show the location of the work point relative to upper legs 212.

Attachment features 312, 322, 323 enable the height of the bearing assembly or other torque tube support element to be adjusted until the axis of rotation is aligned with the work point. As discussed herein, this is important to keep the truss in tension and compression while minimizing and ideally eliminating any bending moment.

It should be appreciated that when installing an adapter such as adapter 300 in FIGS. 5A/B, a laser level and jig may be used to insure that the height of the adapter with respect to the ground will orient the rotational axis of the intended bearing assembly with the work point. The jig may include a laser target and extend above the adapter a distance that matches the geometry of the rotational axis of the intended bearing assembly so that when a tracker installation crew begins the post-foundation installation, their bearing assembly or torque tube support elements will already be elevated to the appropriate height. Ideally, only horizontal adjustments will be necessary because the rotational axis will already be centered at the work point height. When the laser indicates that the jig is on target, the connection between the upper legs and the adapter may be locked in place by crimping, set screws, bolts, sleeves or other suitable fastening mechanism or their functional equivalents.

Adapter 300 shown in FIGS. 5A/B is shown as being formed like an H-pile with welded on features such as coupling portions 330, and therefore requires a hot roll-forming process. Roll-forming processes requires a great deal of energy to get the metal hot enough to enable it to be worked from a bar to a beam under the pressure of the rollers. It should be appreciated that other designs may be used to accomplish the same geometry. For example, in some cases, it may be desirable to achieve the benefits of adapter 300 of FIGS. 5A/B with an adapter made through a less energy intensive manufacturing process. To that end, FIG. 6A shows an adapter that is manufactured from stamping or a combination of stamping and welding rather than hot roll-forming.

Figure 6A:
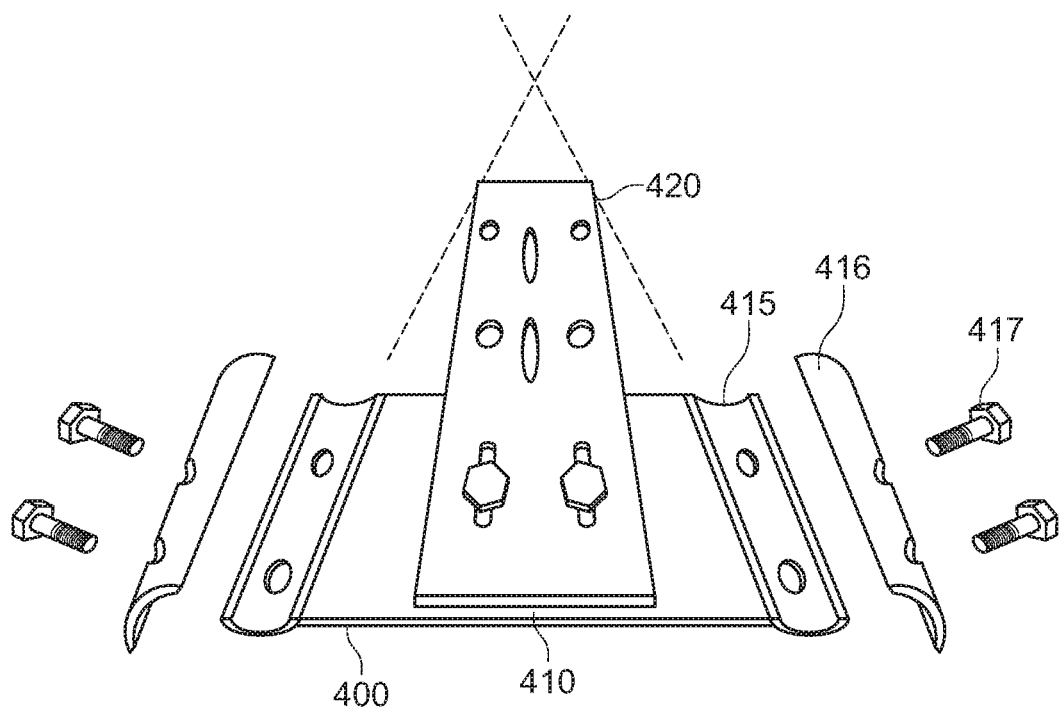
FIG. 6A is a front view of another adapter for a single-axis tracker that orients lateral loads at the work point of an A-frame-shaped truss foundation according to various embodiments of the invention.

Adapter 400 of FIG. 6A is shown as substantially planar trapezoidal body 410 with angled side portions 415 configured as symmetric half-tube sections angled at reciprocal angles (e.g., ±30-degrees) with respect to vertical. In some embodiments, angled side portions 415 may be stamped in the same piece of sheet metal as trapezoidal body 410. In other embodiments, side portions 415 may be welded to respective left/right edges of trapezoidal body 410. In various embodiments, side portions 415 may be oriented at angles in a range of greater than ±17.5 degrees up to 35-degrees with respect to vertical to match the chosen angle of the truss legs. Put otherwise, side portions 415 may separate the truss legs so that they are angled apart from one another by more than 35-degrees up to 70-degrees.

As shown, trapezoidal body 410 is configured as a web with attachment holes for attaching a torque tube bearing or, as in this case, adjustable mounting plate 420. Mounting plate 420 replicates the geometry of an H-pile web but also extends main body 410 in the vertical direction, allowing the height of any bearing assembly attached to it be vertically adjusted to align the axis of rotation of that assembly with the work point of the A-frame. In other embodiments, the bearing assembly or torque tube support element may be attached directly to trapezoidal member 410 without adjustable mounting plate 420. In various embodiments, the free end of each truss leg will fit in half tube sections 415. Tubular caps 416 may be bolted through the legs with bolts 417, completing the truss. Caps 416 in FIG. 6A are shown as having through-holes for passing fasteners through each upper leg 212, however, it should be appreciated that in other embodiments the tubular caps may include flat flanges extending beyond either side of the curved portions that engage with a matching flange in the curved side portions 415 and/or in trapezoidal body 410 to receive mechanical fasteners holding them together. This may eliminate the need to form holes in the above ground ends of the extension piles.

Figure 6B:
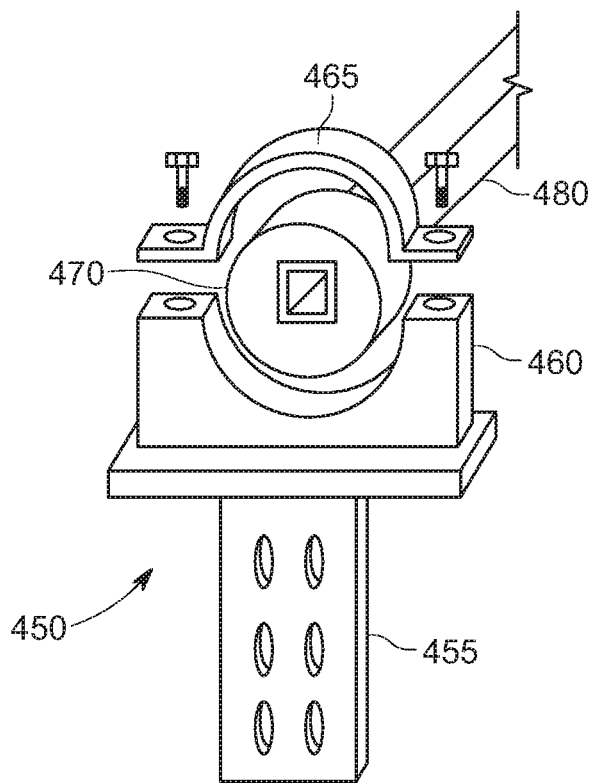
FIG. 6B is a conventional bearing assembly for a single-axis tracker usable with the adapters shown in FIGS. 5A/B and 6A.

FIG. 6B is a generic web-mounted bearing assembly 450 such as that shown in FIG. 2A. The assembly consists of mounting flange 455, a planar support piece with multiple mounting holes, bearing base 460 providing a lower half of the bearing, and bearing cap 465. Torque tube 480 shown here has a boxed cross section and includes rounded bearing insert 470 that mates with the inner surface of bearing cap 465 and bearing base 460. In various embodiments, generic bearing assembly 450 shown in FIG. 6B may be attached directly to trapezoidal portion 410 of adapter 400 rather than mounting plate 420. The holes formed in mounting flange 455 may allow the height and East-West (left-right) orientation of bearing assembly 450 to be adjusted with respect to adapter 400 to align the axis of rotation with the work point.

Figure 7A:
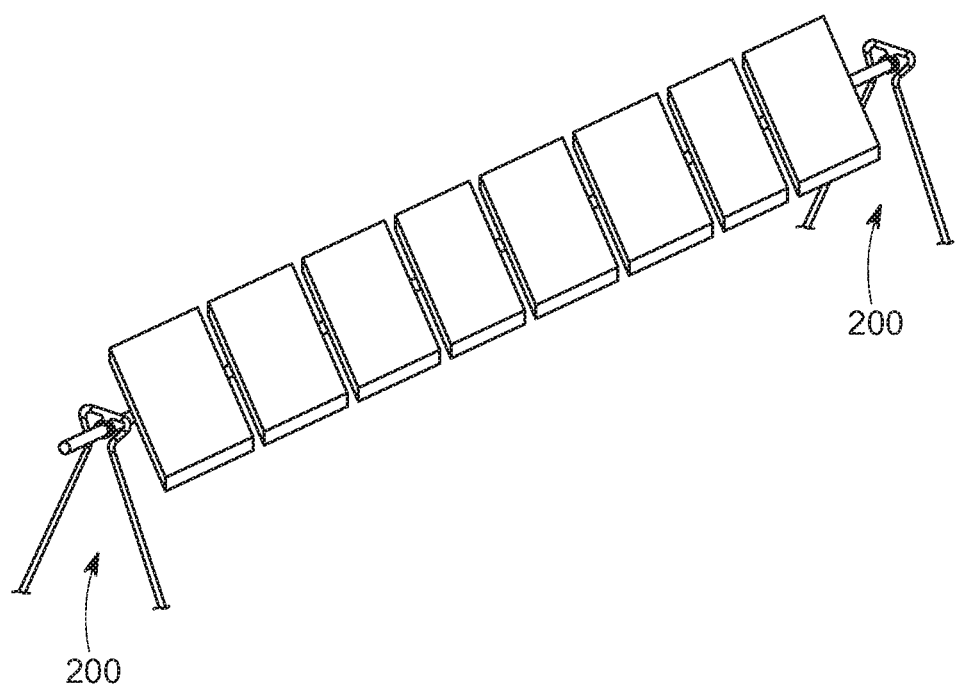
FIG. 7A is a perspective view of a single-axis tracker supported by truss foundations according to various embodiments of the invention.
Figure 7B:
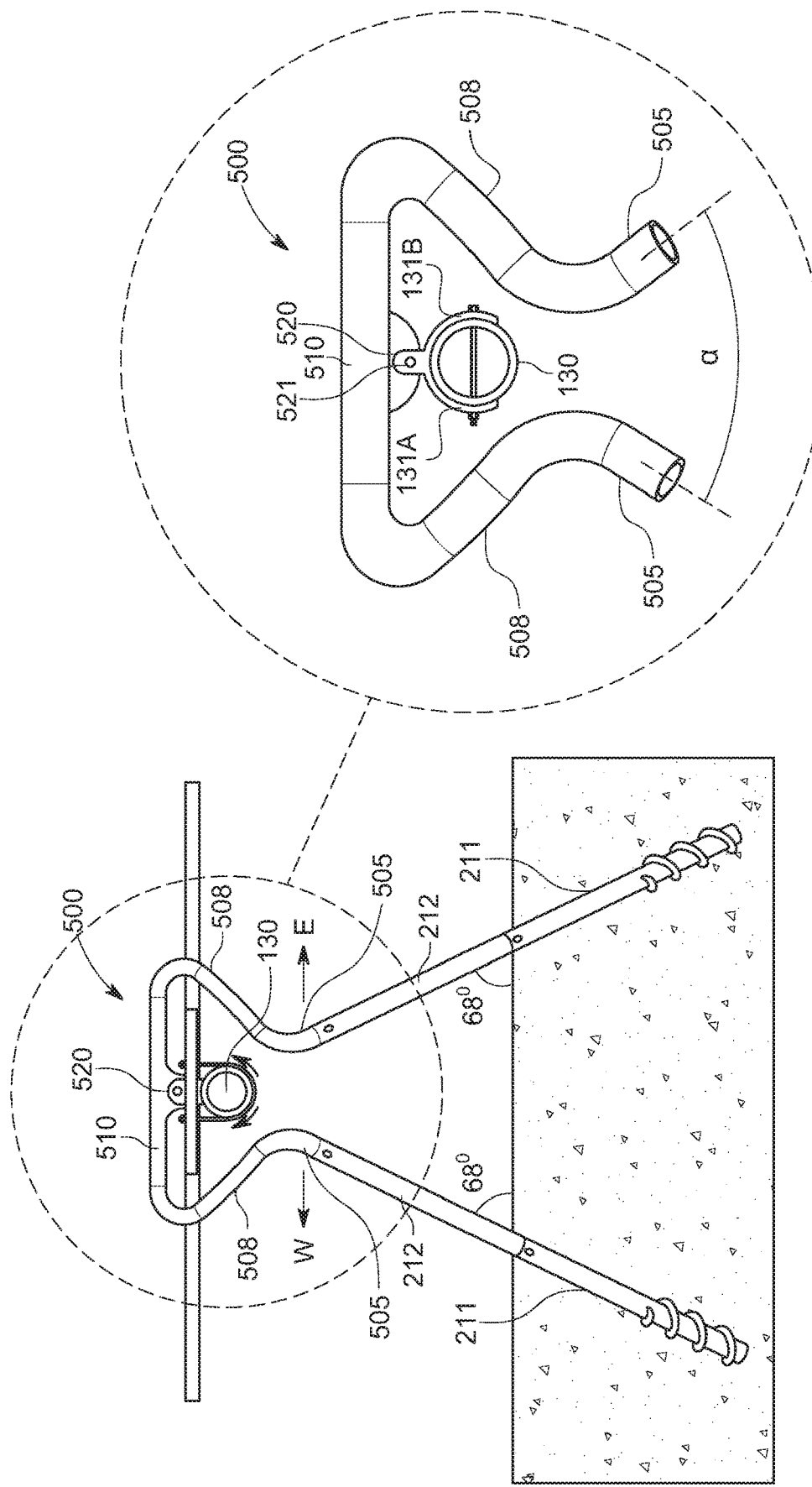
FIG. 7B is an end view of the single-axis tracker and truss foundation of FIG. 7A.

Turning now to FIGS. 7A/B, these figures show perspective and end views of a top-down single-axis tracker and bearing adapter 500 for such a tracker that aligns the tracker's axis of rotation with the truss or A-frame work point. Bearing adapter 500 shown here is designed interface an A-framed-shaped truss foundation with a mechanically balanced tracker system such as that available from NEX-TRACKER or other tracker makers. The term "bearing adapter," as used herein, refers to structures that combine the functions of an adapter—joining the ends of the legs to complete the A-frame so that the legs are aligned with respect to the rotational axis—and a bearing—rotatably receiving a rotating member. Bearing adapter 500 of FIGS. 7A/B joins the free ends of each truss leg, providing a support for hanging the torque tube, and aligning the truss legs with the rotational axis of the torque tube by separating them so that they each point at the work point. In various embodiments, the legs are separated by and angle of more than 35-degrees up to 70-degrees to reduce the magnitude of axial forces generated by lateral loads on the tracker. As discussed in the context of FIGS. 2C and D, in a top-down, mechanically balanced system, the torque tube clamp sections holding the torque tube rotate about a bearing pin passing through a clamp support. This causes the torque tube to sweep through an arc as it moves from an East-facing orientation to a West-facing orientation rather than simply rotating about its own axis. Bearing adapter 500 provides the functionality of conventional torque tube clamp supports (e.g., elements 124/126 in FIGS. 2C/2D) but in a form factor optimized for truss foundations.

Starting below ground, foundation 200 consists of legs 210 each formed from screw anchors 211 and upper legs 212. Screw anchors 211 have been rotated into the underlying soil angled toward one another, in this example at ±68-degrees with respect to horizontal. In various embodiments, each screw anchor 211 has an external thread form beginning at the below-ground end to assist with driving and to resist axial forces. The thread form may be uniformly wide or may have a tapered lead-in. Upper leg 212 is axially coupled to the above-ground end of each screw anchor 211 to form a partial A-frame using one of the various joining methods discussed herein. The open ends of tubular bearing adapter 500 are coupled to respective free ends of each upper leg 212 to complete the A-frame. In various embodiments, a crimp collar or other suitable device may be used to join the second end of adapter 500 with the second leg after the first end has been mated with the first upper leg.

Adapter 500 is a tubular structure with a bridge portion 510 with cylindrical bearing 520 passing through its approximate middle. Symmetric arms 508 join bridge portion 510 to connecting portions 505. Hinge and clamp assembly 131A/B holding torque tube 130 is supported by bearing 520 via bearing pin 521. Clamp assembly 131A/B holds torque tube 130 in place so that it can rotate about bearing pin 521. In addition, in this system a pair of U-bolts straddle the torque tube to pin the module support bracket to torque tube 130. Photovoltaic modules, otherwise known as solar panels, are then attached along the torque tube 130 to each module support bracket, with each bracket joining the edges of two adjacent modules. In various embodiments, bearing adapter 500 is designed to work with truss legs that have been driven at specific angles so that bearing pin 521 at the top of adapter 500 will be precisely located at the work point of the A-frame, although in various embodiments, the coupling between bearing adapter 500 and upper legs 212 may allow for some relative height and angular adjustment. This is accomplished by angling connecting portions 505 so that a line through their respective centers points at cylindrical bearing 520. When upper legs 212 are attached to connecting portions 505, the legs will define respective axis substantially pointing at the axis of rotation, in this case, bearing pin 521.

Hanging a torque tube requires clearance in the East-West direction between the bearing and the foundation. Tubular bearing adapter 500 of FIGS. 7A/B accomplishes this with symmetric arms 508. Bearing 520 at the approximate midpoint of bridge section 510 receives bearing pin 521 from which torque tube 130 hangs. As with the torque tube clamp support included with the NX system (e.g., seen in FIGS. 2B and C), bearing pin 521 passes through bearing 520 of bearing adapter 500 and the two halves of the hinge clamp 131A/131B are attached to opposing ends of pin 521 so that the clamp halves 131A/B straddle bearing adapter 500. The two halves 131A/B of clamp 131 are bolted to torque tube 130 to complete the connection.

In various embodiments, installation of the adapter shown in FIGS. 7A/B may be accomplished by attaching bearing adapter 500 and clamp and hinge assembly onto torque tube 130 and then lifting rigged tube 130 above the row of A-frame piles with a crane, forklift, loader or other device, so that the free end of each adjacent upper leg 212 of each foundation 200 may be inserted into respective openings of each bearing adapter 500. Alternatively, individual torque tube sections may be laid down on the ground between each adjacent A-frame foundations 200 before the bearing adapter and clamp and hinge assembly are attached. The sections of torque tube may then be lifted into place and the clamps bolted to pre-drilled holes formed on a regular schedule along the torque tube sections so that they can be attached to their respective tubular bearing adapters 500.

Figure 8A:
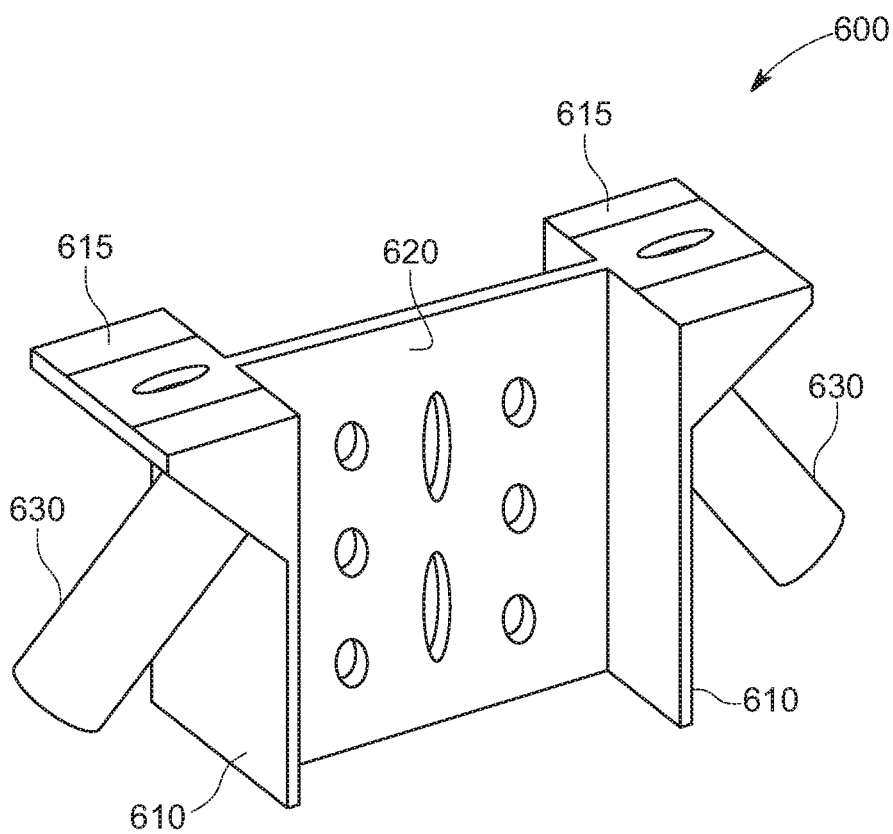
FIG. 8A is perspective view of a universal adapter for a single-axis tracker that orients lateral loads at the work point of an A-frame-shaped truss foundation according to various embodiments of the invention.

Turning now to FIGS. 8A and B, these figures show another universal adapter 600 according to various other embodiments of the invention. As with universal adapter 300 shown in FIGS. 5A/B, adapter 600 of FIGS. 8A/B is configured dimensionally to replicate an H-pile section. It is formed from flanges 610 interconnected by orthogonal six-inch web 620. Unlike bearing adapter 500 shown in FIGS. 7A/B, adapter 600 of FIGS. 8A/B does not include any of the bearing assembly components. Rather, those components are off-the-shelf components, such as those shown in FIGS. 2A, 2C, and 2D. As shown, orthogonal web portion 620 is arranged vertically, however, it should be appreciated that it may also have one or more horizontal portions extending between the top of each flange 610. Connecting portions 630 project downward out of the surface of each flange 610 to couple with respective adjacent upper legs 212. In various embodiments, connecting portions 630 are oriented at an angle β with respect to the vertical flange surface in a range of greater than ±17.5 degrees up to ±35 degrees to match the angle of the corresponding upper leg 212, which in various embodiments will be 90-β. Together, connecting portions will separate the legs by an angle α, which is preferably in a range of more than 35-degrees up to 70-degrees.

Coupling portions 630 may include one or more holes to receive set screws, bolts or other mechanical fasteners to secure them to upper legs 212. Optional platform portions 615 may sit on top of the opposing flanges 610 to provide an extended width mounting surface, such as, for example, to replicate right angle brackets 127 shown in FIG. 2D. Triangles may be welded between these portions and corresponding flanges 610 to provide additional rigidity and prevent them from deflecting under load. In various embodiments, platform portions 615 will allow adapter 600 to be used with tracker systems designed to sit atop a flat support surface, or, alternatively to support a tracker drive motor which is typically mounted on a flat mounting surface.

Figure 8B:
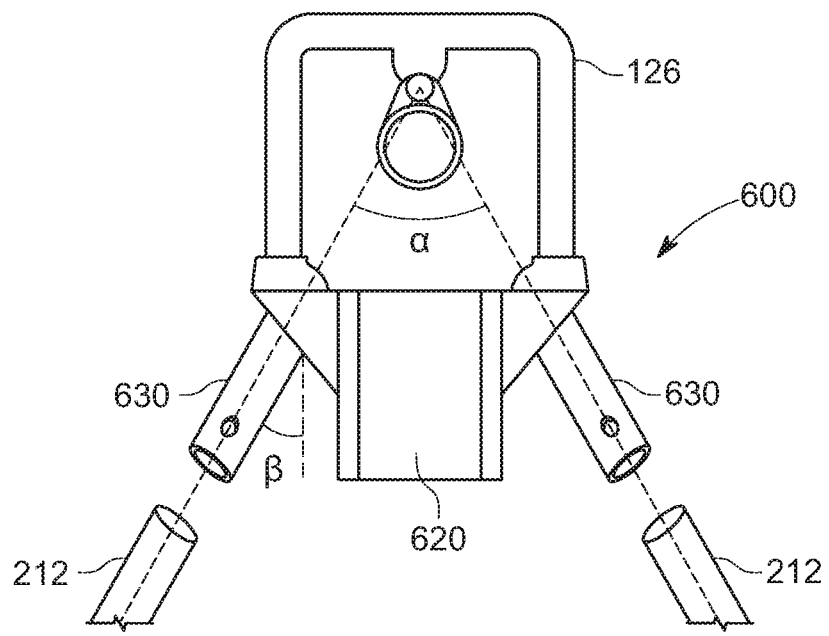
FIG. 8B is an end view of the adapter shown in FIG. 8A.

FIG. 8B shows adapter 600 of 8A used to support torque tube clamp support 126 for a top-down tracker such as that shown in FIG. 2D. As shown, torque tube clamp support 126 rests on platform portions 615 of universal adapter 600. In the figure, dashed lines have been drawn through the center of mass of each upper leg 212 and coupling portions 630 until they intersect to show that the dimensions of the universal adapter orient the torque tube clamp support's bearing with the A-frame or truss work point. It should be appreciated that although FIG. 8B shows universal adapter 600 of 8A used with the single-axis tracker of FIG. 2D, adapter 600 may be used with various other single-axis trackers, including, but not limited to those shown in FIGS. 2A, 2B and 2C.

Figure 9A:
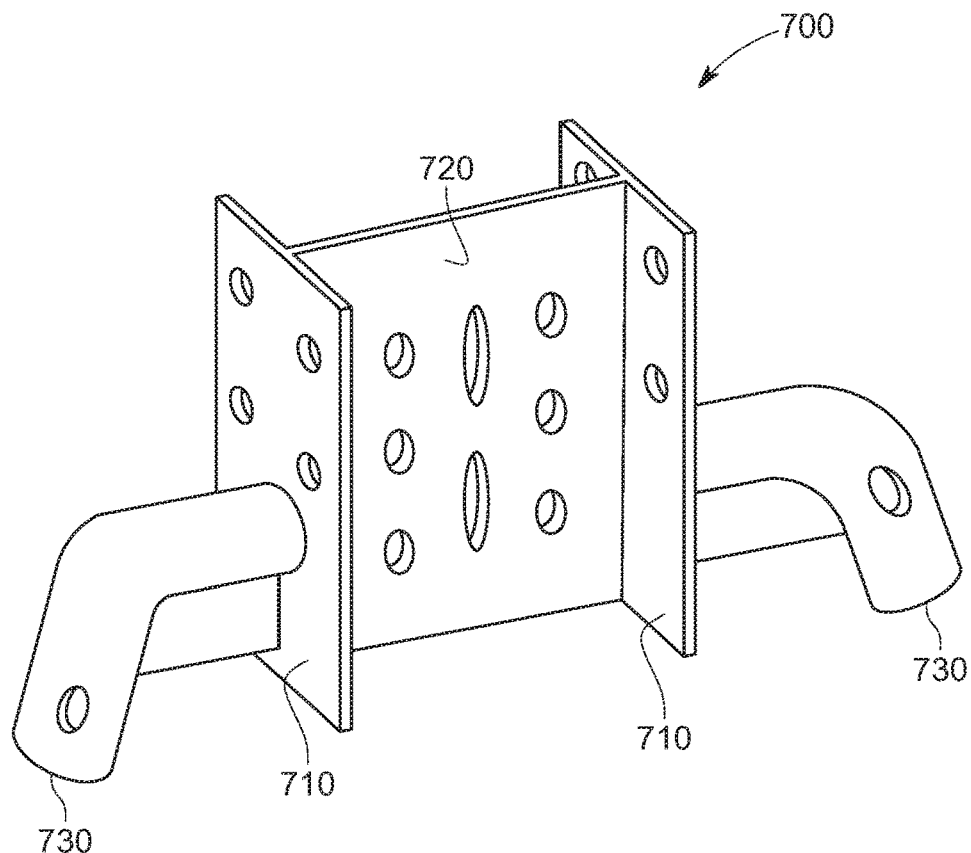
FIG. 9A is a perspective view of another universal adapter for single-axis tracker that orients lateral loads at the work point of an A-frame-shaped truss foundation according to various embodiments of the invention.

Turning to FIG. 9A, this figure shows another universal adapter 700 for a single-axis tracker according to various other embodiments of the invention. Adapter 700 is like that of FIGS. 8A/B but coupling portions 730 are spaced further apart and have a bend in them. Also, mounting platforms 615 shown on adapter 600 have been removed. It should be appreciated that in various embodiments, adapter 700 may include mounting features such as those shown in conjunction with adapter 600. Depending on the dimensions of the tracker components, when supporting some trackers, there may not be enough room above the adapter to allow the axis of rotation to be aligned with the work point because the bearing assembly, in this case, U-shaped torque tube clamp support 126, will extend too far above the adapter to allow the axis of rotation to be aligned with the work point. By spreading out the truss legs and coupling portions 730 that mate with the upper legs 212, while preserving the desired apex angle α, the work point is effectively elevated relative to the adapter, providing more flexibility for alignment in the vertical direction.

Also, as noted herein, nearly all current single-axis tracker makers sell systems that were designed with the assumption that they would be attached to plumb monopiles. Therefore, to maximize market acceptance it may be preferable to eliminate redundancy between the tracker and the foundation. For example, turning back to adapter 600 of FIGS. 8A/B, when used with a current NEXTRACKER system such as that shown in FIG. 2D, platform portions 615 eliminate the need for right-angle brackets 127. Therefore, if adapter 600 will be used to support its tracker, the tracker maker will sell fewer components or the customer pays for a component that it doesn't use, neither of which is ideal. Therefore, in some cases it may be desirable to provide a truss adapter that is completely compatible with OEM single-axis trackers without any functional redundancy. To that end, adapter 700 of FIG. 9A is optimized to support NEXTRACKER's NX series tracker without any functional redundancy by providing the attachment features that the NX system is designed to attach to on each flange.

Figure 9B:
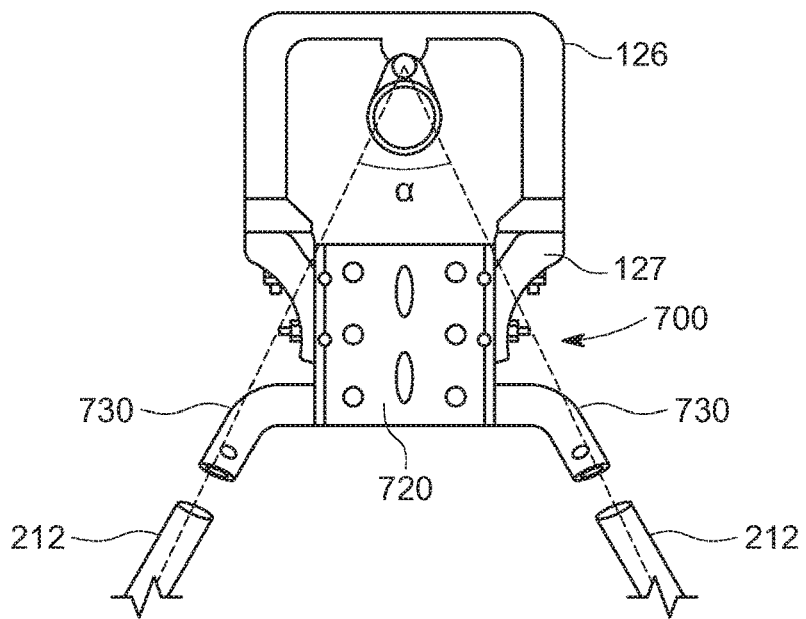
FIG. 9B is an end view of the adapter shown in FIG. 9A.

Turning to FIG. 9B, right-angle brackets 127 bolt to the outside surface of each flange using predrilled holes. These brackets convert the vertical plane of flanges 710 into horizontal mounting platforms for the feet of torque tube clamp support 126. The hinge assembly, torque tube clamp and tube are attached above adapter 700 in a manner consistent with that discussed herein in the context of FIG. 2D. It should be appreciated that the application of universal adapter 700 in the system of 9B is exemplary only. This adapter 700 may be used to support a variety of other tracker systems including but not limited to the prior art systems shown in FIGS. 2A-B.

Turning to FIGS. 10A-D, collectively these figures show two variations of a universal adapter (800/900) for aligning the axis of rotation of a single-axis tracker with the truss work point according to further embodiments of the invention. Starting with FIGS. 10A and C, adapter 800 is shown supporting a bottom-up tracker, although it should be appreciated that by adding right angle brackets to either side, adapter 800 could also support a top-down tracker. Adapter 800 has main body portion 810 and connecting portions 820 extending down and away from main body 810 to couple to truss legs 210. In various embodiments, coupling portions 820 extend down to separated legs 210 by an angle $\alpha$ in a range of more than 35-degrees up to 70-degrees to limit the magnitude of the axial forces generated by lateral loads. In various embodiments, this will orient connecting portions 820 to substantially match the angle of legs 210. For example, if each leg is driven at angle $\theta$ with respect to horizontal of ±60-degrees, then connecting portions 820 will create an apex angle $\alpha$ that is $180-2\theta$, which in this case is also 60-degrees.

In various embodiments, main body portion 810 is approximately 6-inches wide to match the dimensions of a conventional W6×9 or W6×12 H-pile. Also, in various embodiments, fitment between connecting portions 820 and upper legs 212 will allow for adjustment between these structures to enable the adapter's height relative to upper legs 212 to be adjusted before permanently connecting it to upper legs 212 so that the torque tube's axis of rotation, in this case the center of the tube itself, is aligned with the work point of the A-frame. The dotted lines extending through the center of mass of each leg 210 meet at the bearing, showing that the tracker's axis of rotation is in fact aligned with the truss work point.

Figure 10A:
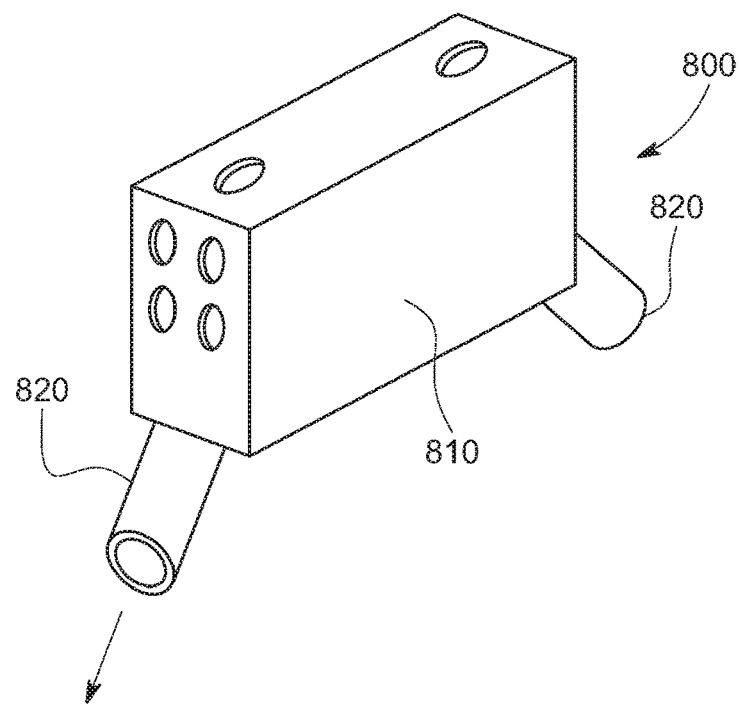
FIG. 10A is a perspective view of a further adapter for a bottom-up single-axis tracker that orients lateral loads at the work point of an A-frame-shaped truss foundation according to various embodiments of the invention.
Figure 10B:
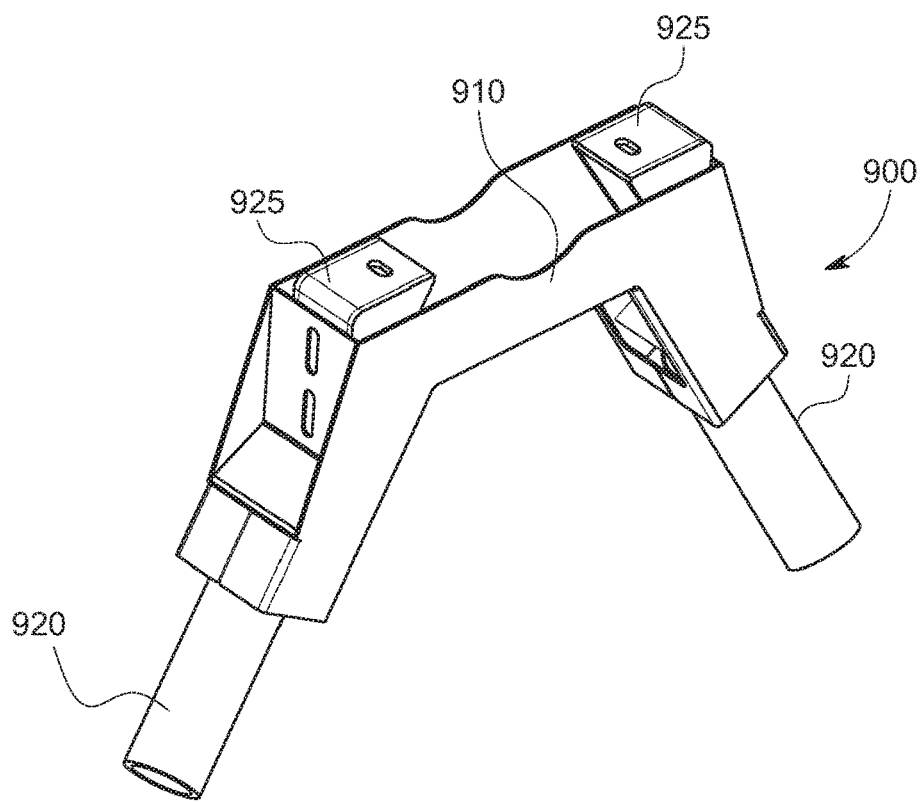
FIG. 10B is a perspective view of a yet adapter for a top-down single-axis tracker that orients lateral loads at the work point of an A-frame-shaped truss foundation according to various embodiments of the invention.
Figure 10C:
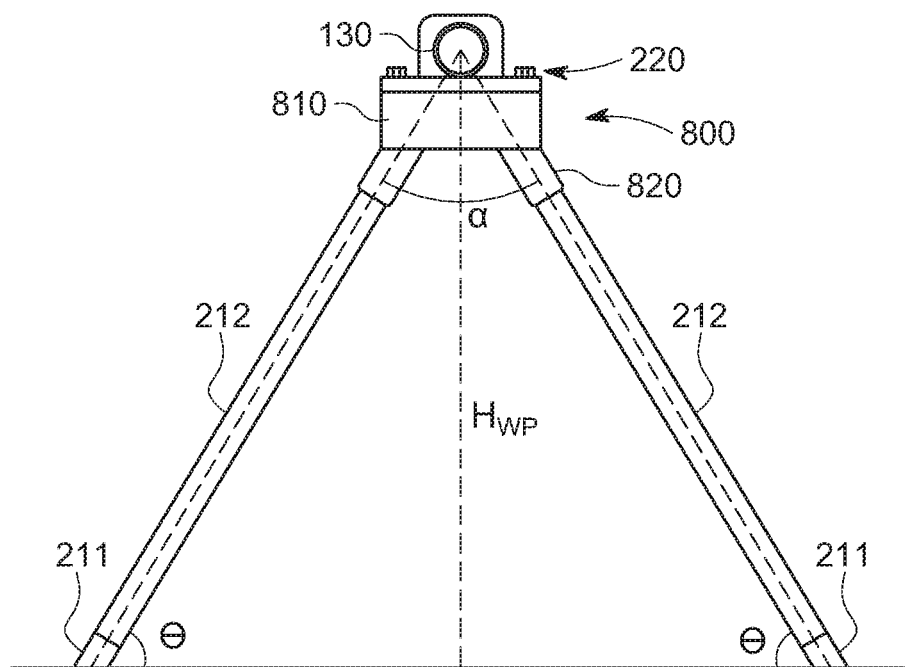
FIG. 10C is an end view of the adapter of FIG. 10A.
Figure 10D:
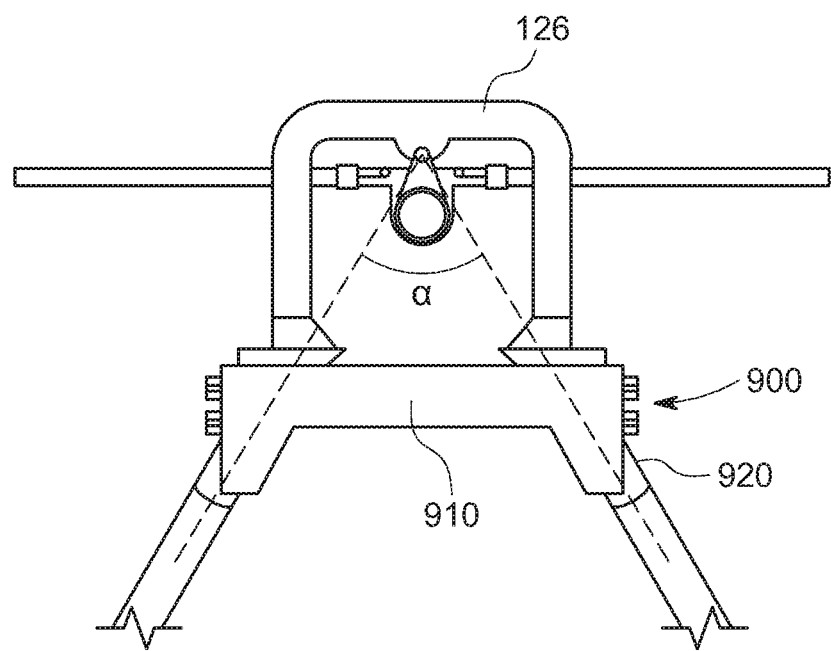
FIG. 10D is an end view of the adapter of FIG. 10B.

FIGS. 10B and D show a similar adapter 900 that may be particularly useful with top-down trackers, such as those shown in FIGS. 2C and D. With this adapter, the spacing between the truss legs as set by connecting portions 920 has been increased relative to adapter 800 so that legs and connecting portion 920 point at a higher work point. This will allow for more height between adapter 900 and the axis of rotation as is required in a top-down design. Adapter 900 according to this embodiment has main body 910 with connecting portions 920 projecting down and out of each side. In various embodiments, connecting portions 920 separate the truss legs by an angle $\alpha$ of more than 35-degrees up to 70-degrees and will oriented connecting portions 920 to match the angle of each corresponding upper leg 212. Right-angle brackets 925 are attached to opposing sides of main body 910 on the inside to create respective mounting platforms for torque tube clamp support 126. The dotted lines in FIG. 10D extending from the center of mass of each leg 210 through respective connecting portions 920 to the bearing, show that the axis is in fact aligned with the foundation's work point.

Turning now to FIGS. 11A-D these figures show universal adapter 1000 for orienting truss legs to be aligned with the tracker's axis of rotation according to various embodiments of the invention. Adapter 1000 shown here consists of a piece of stamped metal configured with left and right-side wings 1001 that are symmetrically positioned around flanges 1010. Flanges 1010 are interconnected by bridge 1020. Each wing 1001 consists of angled portion 1002 and flat portion 1003. Flat portions 1003 generally match the orientation of bridge 1020 and connect angled portions 1002 to flanges 1010. In various embodiments, angled portions 1002 will separate the truss legs by an angle $\alpha$ in a range of more than 35-degrees up to 70-degrees. Angled portions 1002 serve as a base for connecting portions 1005 that receive, inserted into, or are otherwise axially connected to the ends of respective upper legs 212 to complete the truss. In various embodiments, connecting portions 1005 are welded onto the bottom face of angled portions 1002 to project out of their respective surfaces in a downward (ground-facing) direction at an angle that matches the angle of the upper legs 1003 and at a spacing that aligns with them. In various embodiments, this will enable the A-frame to present an H-pile-like interface to the tracker so that the post-foundation installation process will be identical to that done for conventional H-pile foundations. In various embodiments a jig or other device will be used when attaching adapter 1000 to upper legs 212 so that height of the rotational axis will be pre-set to the correct high relative to adapter 1000 for the intended bearing assembly. This will require the installer to know what type of tracker system the foundation will be coupled to.

As shown in this example, the intersection of flat portions 1003 and vertical flanges 1010 is reinforced. It should be appreciated that this is exemplary only. Gussets or other reinforcing members may be added to various points on adapter 1000 to increase rigidity as needed. Flanges 1010 are shown with vertical attachment slots. This is also exemplary only. In various embodiments, flanges 1010 may have one or more holes or slots arranged in a different configuration. Slots may be preferred over holes because they allow for vertical, horizontal and even diagonal adjustability depending on their orientation. In various embodiments, bridge portion 1020 separates flanges 1010 by approximately six-inches to match the distance between flanges on a standard W6×9 (wide flange) H-pile. This will enable a bearing housing assembly or bearing housing support structure from any conventional single-axis tracker to be bolted directly to adapter 1000.

Figure 11A:
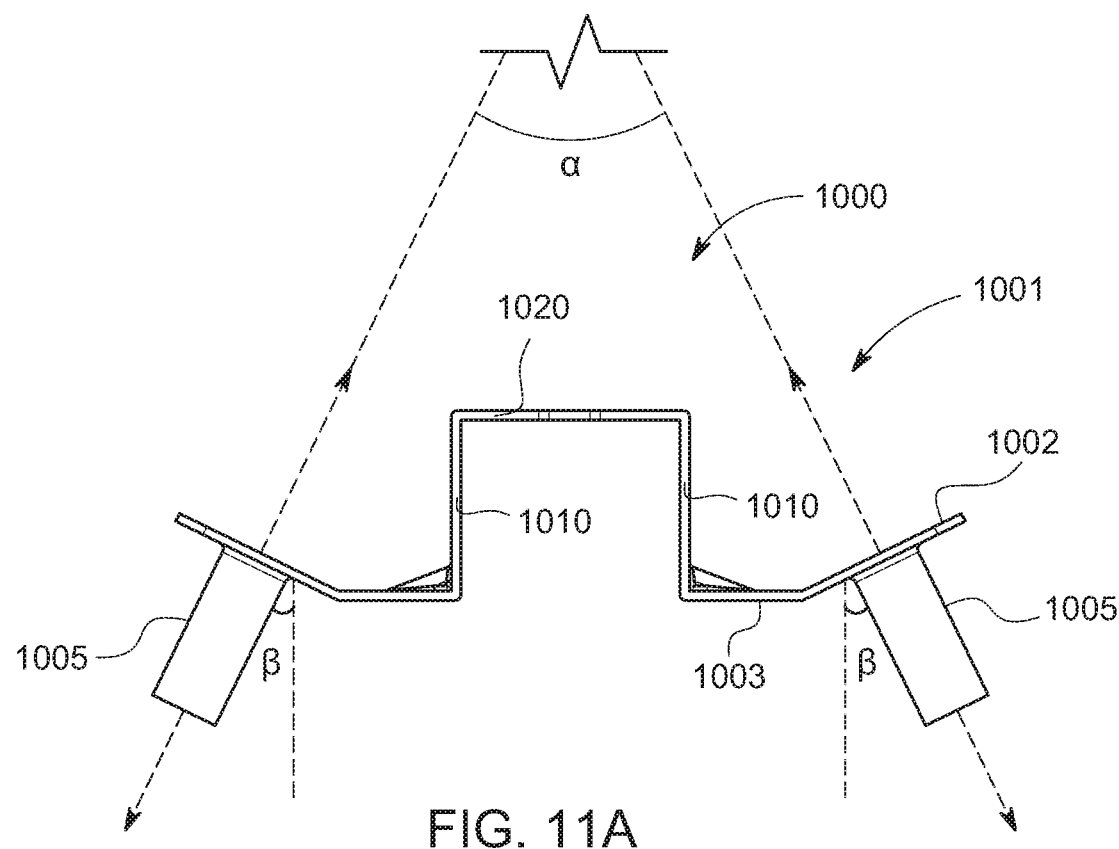
FIG. 11A is an end view universal adapter for a single-axis tracker that orients lateral loads at the work point of an A-frame-shaped truss foundation according to various embodiments of the invention.
Figure 11B:
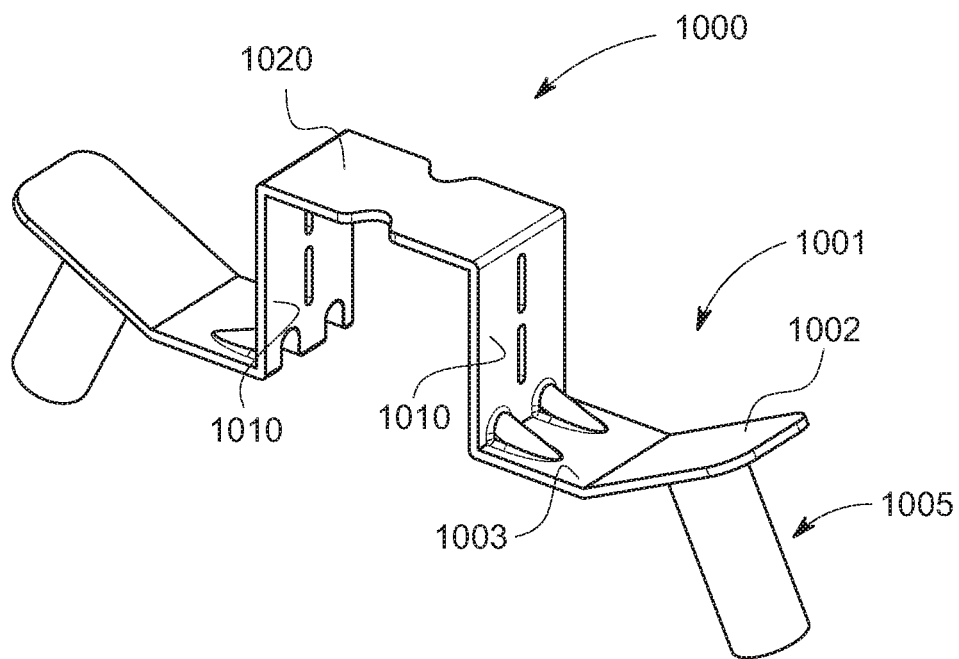
FIG. 11B is a perspective view of the universal adapter of FIG. 11A.
Figure 11C:
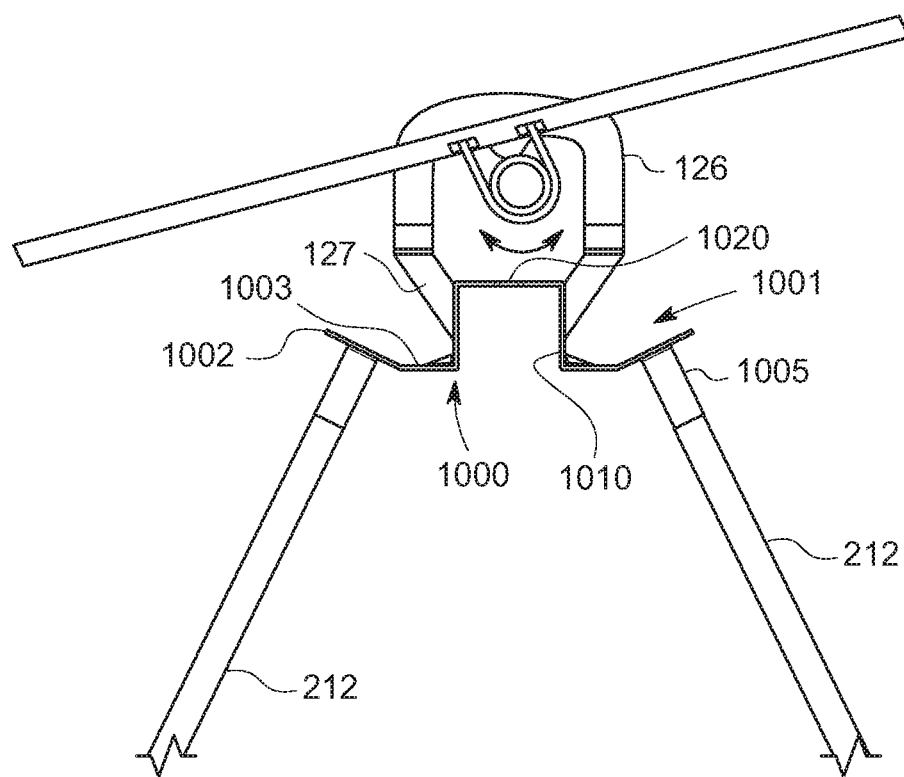
FIG. 11C is an end view of a portion of a top-down single-axis tracker used with the universal adapter of FIGS. 11A and B.
Figure 11D:
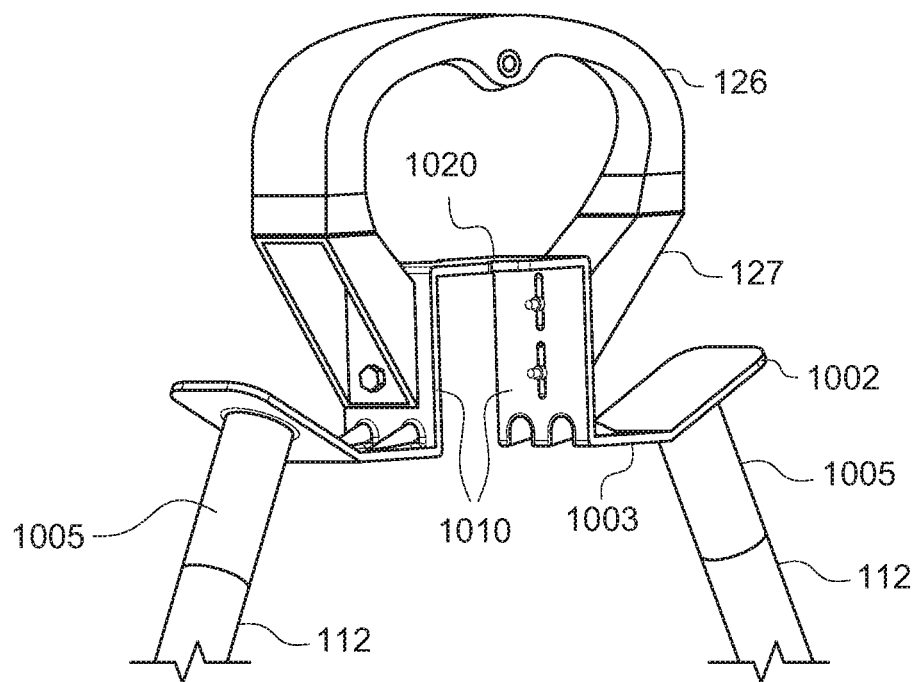
FIG. 11D is a perspective view of another top-down single-axis tracker used with the universal adapter of FIGS. 11A and B.

FIGS. 11C and D show adapter 1000 from 11A and B supporting a bearing assembly and torque tube of a single-axis tracker. Because the tracker shown here is a top-down design, clamp support 126 requires East-West spacing that is wider than the standard 6-inch width of a W6×9 H-pile. Consequently, NEXTRACKER attaches right-angle brackets to the outside face of each H-pile flange to effectively widen the pile. Adapter 1000 provides the same upper geometry as a conventional H-pile allowing such right-angle brackets to be attached directly to slots formed in each flange. The result is that the same tracker parts may be used regardless of whether H-piles or A-frame foundations are used. In various embodiments, adapter 1000 is dimensionally optimized so that when clamp support 126 is seated, the connecting portions 1005, and by extension upper legs 212, will point at the bearing so that the axis or rotation is aligned with the work point. Attachment slots on flanges 1010 may be used to adjust the height of the bearing in the torque tube clamp support 126 relative to adapter 1000.

Turning now to FIGS. 12A-E, these figures show cardioid-shaped bearing adapter 1100 specifically adapted to support a top-down single-axis tracker. Bearing adapter 1100 performs similarly to tubular bearing adapter 500 shown in FIGS. 7A/B, serving at least three functions. First, it unifies the adjacent legs of the A-frame to form a rigid truss structure. Second, it replaces the torque tube support bracket and right-angle brackets of conventional top-down tracker systems, providing a bearing to hang the torque tube from and clearance for it to swing through its East-West arc while reducing the steel and components needed to do so. Finally, it orients the legs of the foundation so that they are aligned with the bearing, something that is only needed in the context of a truss or A-frame foundation. This is accomplished by controlling the geometry between the legs of the A-frame so that the hinge point aligns with the intersection of the respective axes defined by the legs.

Bearing adapter 1100 is formed from one or more cast metal pieces. It should be appreciated, however, that other manufacturing techniques may be employed without departing from the spirit or scope of the invention. Bearing adapter 1100 consists of cardioid-shaped hoop 1110 with cusp 1115 and symmetric S-shaped arms 1120, located on either side of cusp 1115. Bearing 1127 is positioned at cusp 1115. S-shaped arms 1120 terminate in respective connecting portions 1125, which, in various embodiments are angled to point at bearing 1127 and to set an apex angle α between the legs of at least 35-degrees up to 70-degrees. In various embodiments, the desired angle will be known in advance and bearing adapter 1100 will be manufactured to maintain that angle.

Connecting portions 1125 shown in this example are drawn as partial tubes. In various embodiments, cover plates 1126 that are also tubular will fit over the upper legs 212 of the A-frame and mate with connecting portions 1125 to capture the upper legs. Bolts, rivets, or other known mechanical fasteners may be used to secure the cover plates 1126 to connecting portions 1125. It should be appreciated that in other embodiments, connecting portions may be complete tubes at the end of each S-shaped arm 1120 dimensioned to receive or fit inside the free ends of each adjacent upper legs 212. Such modifications are within the scope of the various embodiments of the invention. Bearing 1127 receives a bearing pin from which torque tube 130 is suspended. Module brackets 135 couple the solar panels (photovoltaic modules) to torque tube 130. Because a monopile foundation is not used, the ends of S-shaped members 1120 do not need to intersect at a common mounting platform. This design takes more efficient advantage of the truss architecture and may simplify installation. For example, if after each pair of truss legs is installed, the torque tube or torque tube sections may be laid on the ground between the truss legs. Once bearing adapters, such as adapter 1100, are attached to torque tube 130 at the appropriate locations, the entire tube or tube sections can be lifted with a forklift or other equipment so that individual connections between adjacent legs and connecting portions 1125 can be made.

Figure 12C:
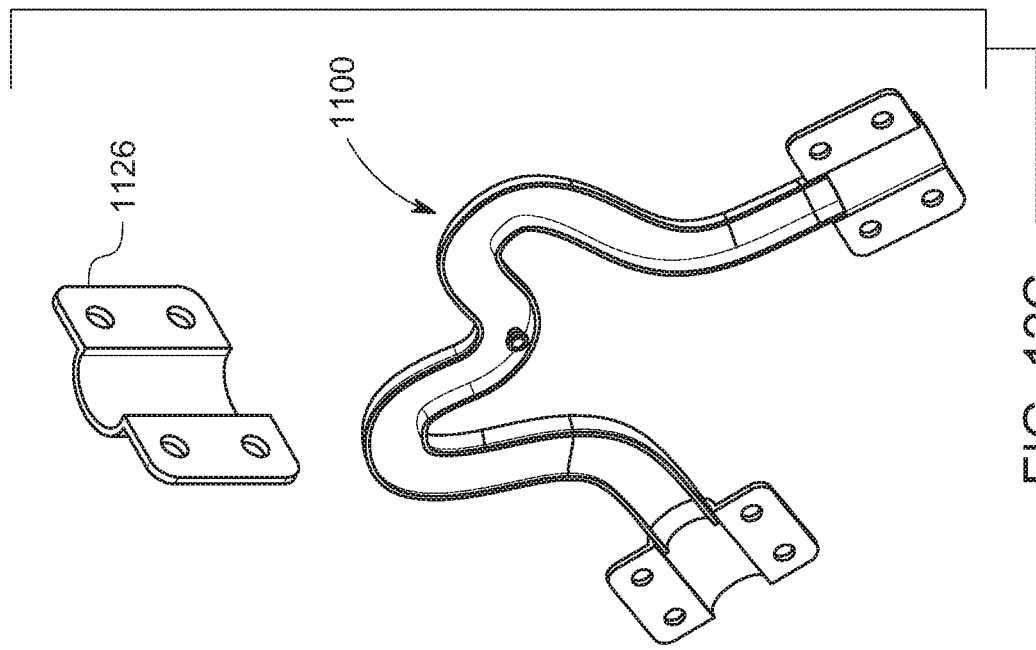
FIG. 12C is a partial exploded view of components of the bearing housing assembly of FIG. 12A.
Figure 12B:
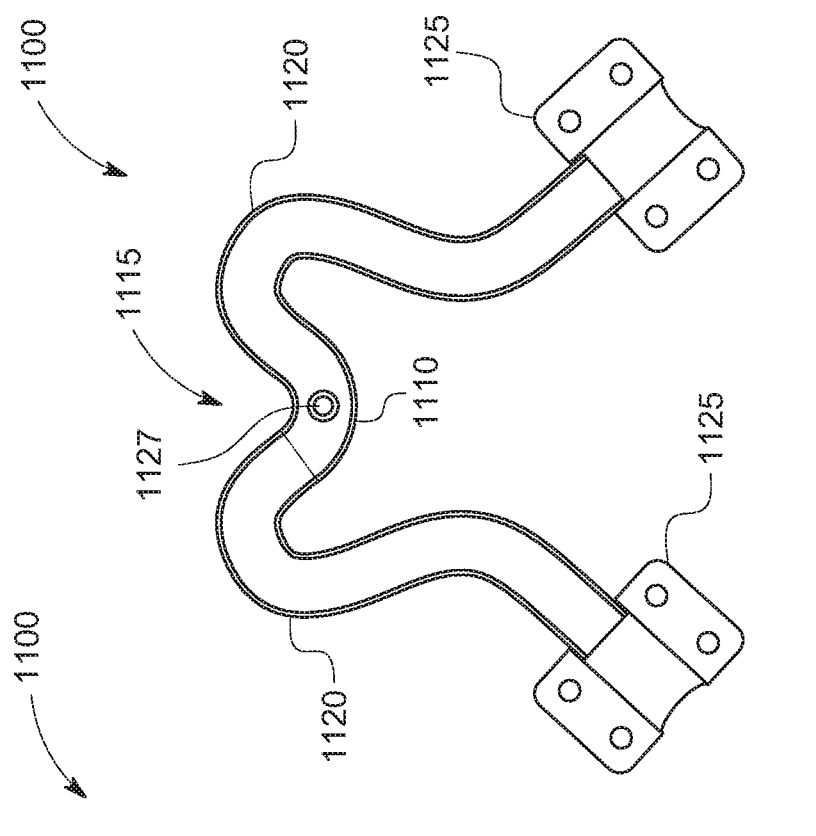
FIG. 12B is a front view of the bearing housing assembly of FIG. 12A.
Figure 12A:
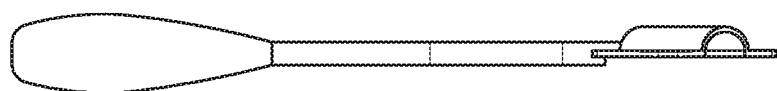
FIG. 12A is a side view of a bearing housing assembly for use with an A-frame according to various embodiments of the invention.
Figure 12D:
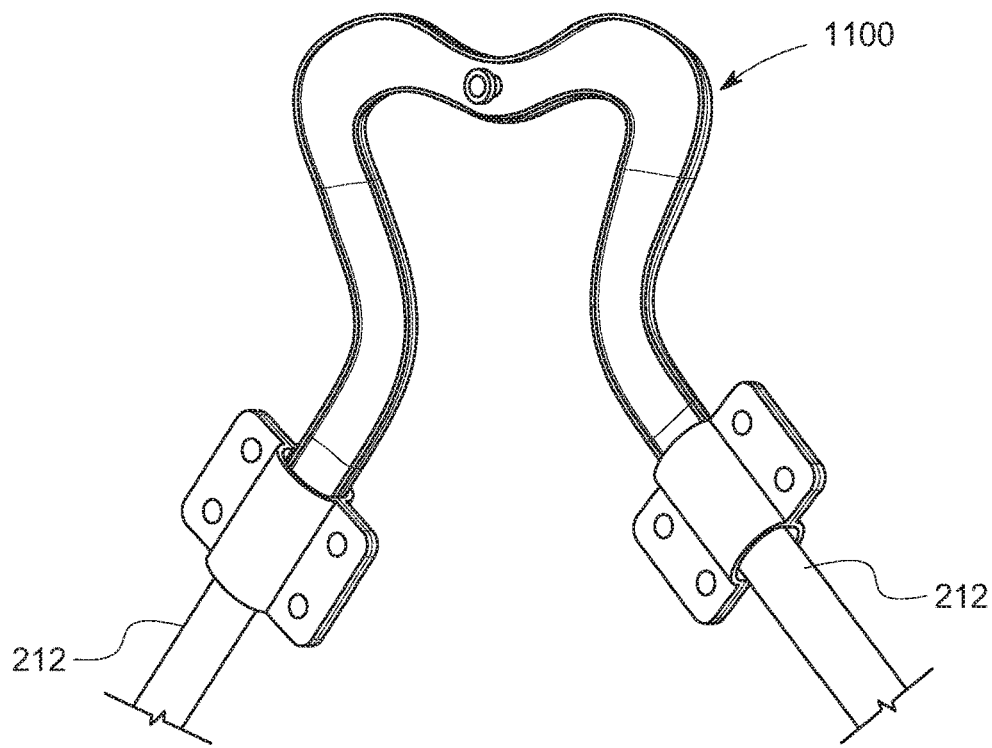
FIG. 12D is a front view of the bearing housing assembly of FIG. 12A with a truss foundation aligning the axis of rotation with the truss work point according to various embodiments of the invention.
Figure 12E:
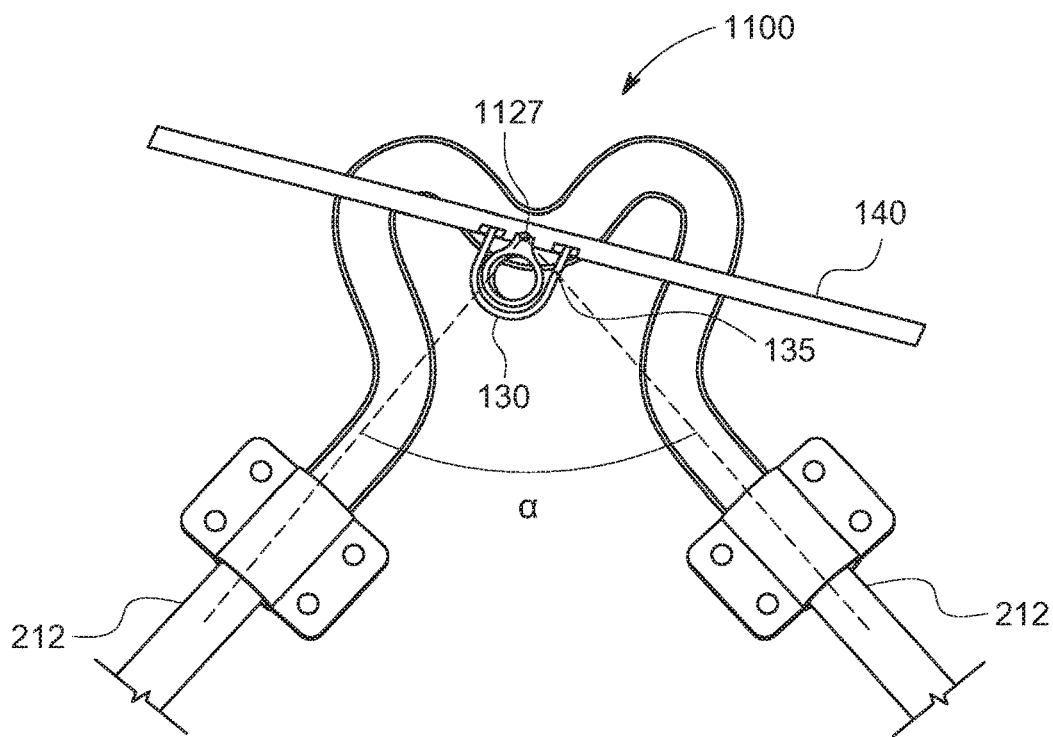
FIG. 12E is an end view of a portion of a top-down single-axis tracker using the bearing housing assembly of FIG. 12A and truss foundation according to various embodiments of the invention.

FIGS. 12D and E show bearing adapter 1100 of FIGS. 12A-C attached to a pair of adjacent foundation legs 2 and supporting a top-down tracker array according to various embodiments of the invention. Together, bearing adapter 1100 and upper truss legs 210 create an A-frame that defines a substantially common East-West oriented plane that is substantially orthogonal to the main axis of the torque tube. Put otherwise, the legs are aligned along the torque tube to intersect at the same location. Orthogonality of the legs will keep the truss in tension and compression and minimize bending in response to lateral loads regardless of the orientation of the torque tube.

Figure 13:
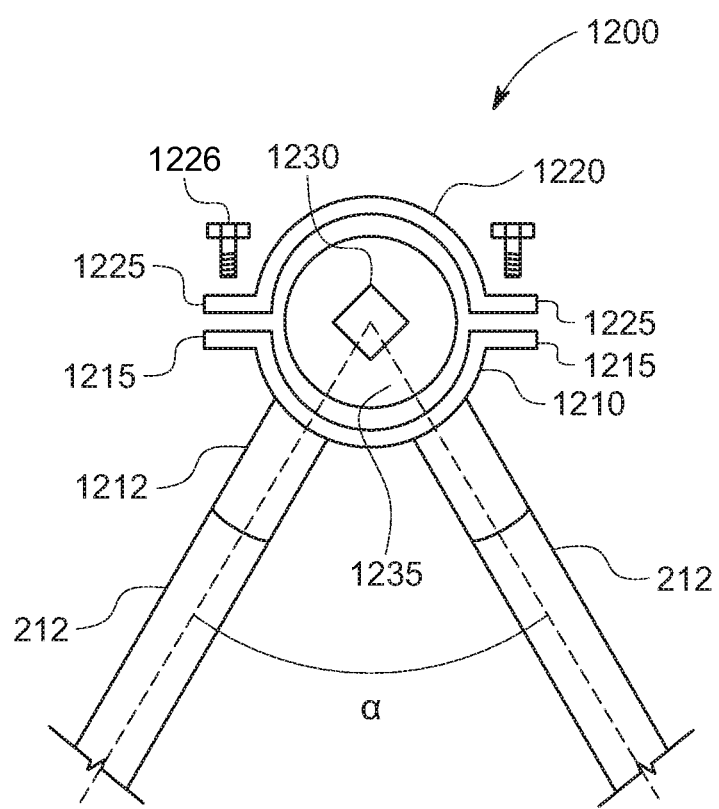
FIG. 13 is an end view of a bearing adapter according to various exemplary embodiments of the invention.

Turning now to FIG. 13, this shows bearing adapter 1200 according to various other embodiments of the invention. The assembly is for a bottom-up style of single-axis tracker. Bearing adapter 1200 consists of a lower body portion 1210 with connecting portions 1212. As with the adapters of various other embodiments, connecting portions 1212 are angled down and away from lower body portion 1210 to be separated from each other by an a in a range of more than 35-degrees up to 70-degrees and will point at the center of the bearing opening. Lower body portion 1210 has a semicircular cross section and acts as the lower half of the circular bearing assembly. Upper portion 1210 fits over lower body portion 1210 via upper flanges 1225 that sit on lower flanges 1215. Bolts 1226 or other known fasteners secures upper portion 1210 to lower body portion 1210. In this example, torque tube 1230 is shown with a boxed cross section. It is surrounded by bearing insert 1235 which, presents a circular shape to match with the circular bearing opening formed by joining lower portion 1210 to upper portion 1220 and may be made of a material with reduced friction relative to metal. Unlike the adapters of other embodiments, bearing adapter 1200 is optimized from a material usage perspective to work with a A-frame-shaped truss foundation because it joins the legs of the truss, matching their angle and spacing while orienting their respective centers of mass to intersect at the axis of rotation, in this case the center of the torque tube. It also provides a bearing so that a separate bearing assembly is not needed.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A bearing adapter for joining truss foundation components supporting a single-axis tracker, the bearing adapter comprising:
   a main body portion;
   a bearing for receiving a rotating member, the bearing having a substantially circular bearing opening;

a bearing cap that attaches to the main body portion to rotatably capture the rotating member within the bearing; and a pair of connecting portions extending from the main body portion and oriented at opposing angles to join a pair of adjacent truss legs so that an axis defined by each leg points at a common work point positioned at the approximate center of the circular bearing opening.

2. The bearing adapter according to claim 1, wherein the pair of connecting portions are separated by an angle in a range of more than 35-degrees up to 70-degrees with respect to the common work point.

3. A foundation system for a single-axis tracker comprising:

a pair of elongated truss legs, each leg comprising a screw anchor and an upper leg portion that are joined together at their respective ends to define a substantially common axis;

an adapter having a main body and a pair of connecting portions projecting away from the main body and spaced apart by an angle in a range of more than 35-degree up to 70-degrees for joining a free end of each truss leg to form an A-frame-shaped truss structure; and a bearing for receiving a rotating component of the single-axis tracker and having a substantially circular bearing opening, wherein each substantially common axis of the pair of truss legs is oriented to intersect one another at the substantially circular bearing opening.

4. The system according to claim 3, wherein the bearing has a lower portion built into the adapter main body and an upper portion joinable to the lower portion.

5. The system according to claim 3, wherein the bearing is separate from and attaches to at least one planar support surface of the adapter.

6. A single-axis tracker comprising:

a plurality of truss foundations installed along a substantially straight row, each foundation comprising a pair of adjacent angled truss legs extending below and above ground that straddle the substantially straight row;

a plurality of adapters, each adapter joining one pair of adjacent angled truss legs to form one of the truss foundations so that an axis through each adjacent legs of the truss foundation point at a common work point of the truss foundation;

a plurality of bearings, each having a circular bearing opening; and a rotating torque tube seated within the plurality of bearings, wherein the rotating torque tube defines a rotational axis for the single-axis tracker that passes through the work point of each truss.

7. The single-axis tracker according to claim 6, wherein the pair of connecting portions are separated by an angle in a range of more than 35-degrees up to 70-degrees with respect to the common work point.

8. The single-axis tracker according to claim 6, wherein each truss leg comprises an upper leg portion coupled to screw anchor to substantially extend a main axis thereof.

9. The single-axis tracker according to claim 6, further comprising a plurality of photovoltaic modules attached to the torque tube.

* * * * *